(12) United States Patent
Zhang

(10) Patent No.: US 11,555,893 B2
(45) Date of Patent: Jan. 17, 2023

(54) LASER SCANNING DEVICE, RADAR DEVICE AND SCANNING METHOD THEREOF

(71) Applicants: HEFEI SURESTAR TECHNOLOGY CO., LTD., Hefei (CN); BEIJING SURESTAR TECHNOLOGY CO., LTD., Beijing (CN)

(72) Inventor: Zhiwu Zhang, Beijing (CN)

(73) Assignees: HEFEI SURESTAR TECHNOLOGY CO., LTD., Hefei (CN); BEIJING SURESTAR TECHNOLOGY CO., LTD., Beijing (CN)

( * ) Notice: Subject to any disclaimer, the term of this patent is extended or adjusted under 35 U.S.C. 154(b) by 513 days.

(21) Appl. No.: 16/606,580

(22) PCT Filed: Apr. 18, 2018

(86) PCT No.: PCT/CN2018/000144
§ 371 (c)(1),
(2) Date: Mar. 9, 2020

(87) PCT Pub. No.: WO2018/192270
PCT Pub. Date: Oct. 25, 2018

(65) Prior Publication Data
US 2020/0326413 A1    Oct. 15, 2020
US 2021/0088630 A9    Mar. 25, 2021

Related U.S. Application Data

(63) Continuation of application No. PCT/CN2018/000144, filed on Apr. 18, 2018.

(30) Foreign Application Priority Data

Apr. 19, 2017 (CN) .......................... 201720413010.7
Oct. 31, 2017 (CN) .......................... 201711043161.9

(51) Int. Cl.
*G03G 15/04* (2006.01)
*G01S 7/481* (2006.01)
*G02B 26/12* (2006.01)

(52) U.S. Cl.
CPC .......... *G01S 7/4817* (2013.01); *G02B 26/123* (2013.01)

(58) Field of Classification Search
CPC ........................... G01S 7/4817; G02B 26/123
(Continued)

(56) References Cited

U.S. PATENT DOCUMENTS 5,793,491 A    8/1998  Wangler et al.
6,317,202 B1   11/2001 Hosokawa et al.
(Continued)

FOREIGN PATENT DOCUMENTS

CA    2651290 A1 * 12/2009 ............. F03D 17/00
CN    1590956 A     3/2005
(Continued)

OTHER PUBLICATIONS

PCT/CN2018/000144—International Search Report, dated Jul. 12, 2018, 2 pages, English Translation. ISR in Chinese, 4 pages.
PCT/CN2018/000144—Written Opinion, dated Jul. 12, 2018, 3 pages.

*Primary Examiner* — Quana Grainger
(74) *Attorney, Agent, or Firm* — Getech Law LLC; Jun Ye

(57) ABSTRACT

Disclosed are a laser scanning device, a radar device, and a scanning method thereof. The laser scanning device comprises a scanning prism comprising a plurality of scanning mirror surfaces, wherein the plurality of scanning mirror surfaces rotates about a scanning axis, a normal of each of the scanning mirror surfaces forms a certain angle with respect to the scanning axis, and the angles thereof are not all the same; a transceiving component comprising a laser (Continued)

transmitting unit and a laser receiving unit, wherein the laser transmitting unit generates a scanning line by rotation of the scanning mirror surfaces, and the same laser transmitting unit generates a plurality of scanning lines by rotation of the scanning prism.

20 Claims, 14 Drawing Sheets

(58) Field of Classification Search
USPC .......................................................... 356/4.01
See application file for complete search history.

(56) References Cited

U.S. PATENT DOCUMENTS

| | | |
|---|---|---|
| 8,767,190 B2 | 7/2014 | Hall |
| 9,239,959 B1 | 1/2016 | Evans et al. |
| 2005/0219504 A1 | 10/2005 | Adachi et al. |
| 2006/0239172 A1* | 10/2006 | Sun .......................... G02B 3/14 |
| 2013/0241761 A1* | 9/2013 | Cooper .................. G02B 26/10 |
| | | 342/54 |

FOREIGN PATENT DOCUMENTS

| | | |
|---|---|---|
| CN | 1677050 A | 10/2005 |
| CN | 102508258 A | 6/2012 |
| CN | 207133508 U | 3/2018 |

\* cited by examiner

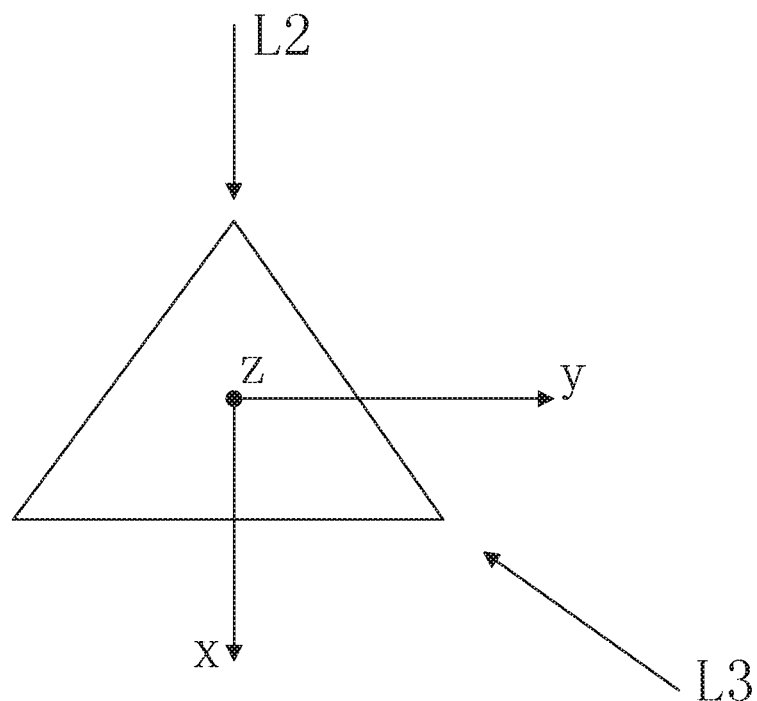
Figure 12A
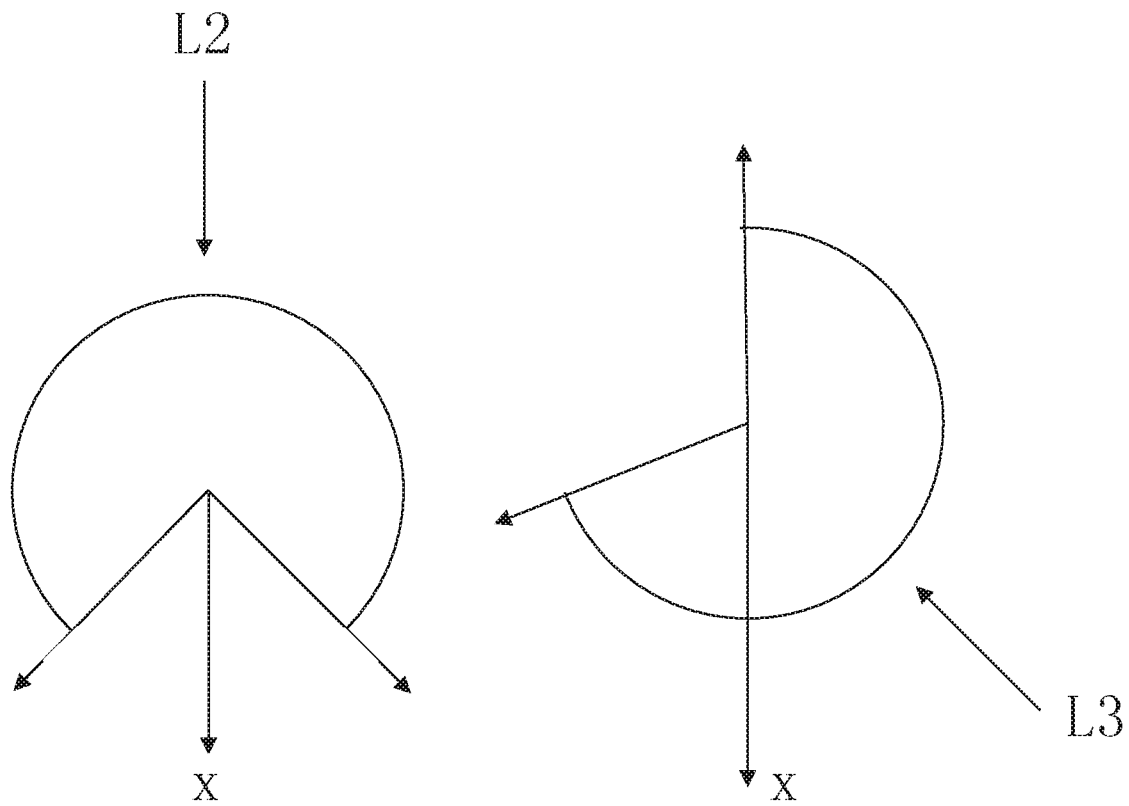
Figure 12B
Figure 12C

LASER SCANNING DEVICE, RADAR DEVICE AND SCANNING METHOD THEREOF

CROSS-REFERENCE TO RELATED APPLICATIONS

This application is a continuation of International Application No. PCT/CN2018/000144, filed on Apr. 18, 2018, which claims priority to Chinese Patent Application No. CN201720413010.7 filed on Apr. 19, 2017 and Chinese Patent Application No. CN201711043161.9, filed on Oct. 31, 2017, both of which are hereby incorporated by reference in their entireties.

TECHNICAL FIELD

The present disclosure relates to the field of three-dimensional laser scanning, and in particular, to a laser scanning device, a radar device and a scanning method thereof.

BACKGROUND

FIG. 1 shows a schematic view of a scanning device in a LiDAR of U.S. Pat. No. 8,767,190B2.

In the scanning device, a motherboard 20 is provided on a frame 22. Plural emitter hybrids 30 are sequentially inserted onto the motherboard 20, and plural detector hybrids 32 are sequentially inserted onto the motherboard 20. The plural emitter hybrids 30 are provided in a vertical direction, and the plural detector hybrids 32 are provided in the vertical direction. The emitter hybrids 30 each is provided with one emitter, and the detector hybrids 32 each is provided with one detector. The frame 22 spins to obtain a 360-degree scanning field of view.

FIG. 2 is a schematic structural view of a laser scanning device in a prior art. The laser scanning device generates an emergent light by a laser emitting unit to generate a scanning line. As shown in FIG. 2, the laser scanning device includes a scanning tower mirror 40 and a transmitting lens group 50. The scanning tower mirror 40 rotates about a rotation axis X. The transmitting lens group 50 is disposed in parallel with a top surface of the scanning tower mirror 40. The scanning tower mirror 40 is a standard quadrangular tower mirror.

The emergent light L emitted by the laser emitting unit 60 is transmitted through the transmitting lens group 50, then reflected by an inclined surface of the scanning tower mirror 40, and emitted outside of the laser scanning device accordingly. An incident light L' generated by diffuse reflection of an obstacle is a light beam, is converged by the transmitting lens group 50 and then received by a laser receiving unit 70.

A position of the laser emitting unit 60 relative to the scanning tower mirror 40 is unchanged. As the scanning tower mirror 40 rotates, the emergent light L scans to and fro within a certain angle field of view.

SUMMARY

The present disclosure discloses a laser scanning device, including: a scanning prism, including a plurality of scanning mirror surfaces, wherein the plurality of scanning mirror surfaces are configured to rotate about a scanning axis, a normal of each of the scanning mirror surfaces forms a space angle with the scanning axis, and the values of all the space angles are not all the same; a transceiver assembly, including a laser emitting unit and a laser receiving unit, wherein the laser emitting unit is configured to generate a scanning line by rotation of the scanning mirror surfaces, and the same laser emitting unit is configured to generate a plurality of scanning lines by rotation of the scanning prism.

The present disclosure discloses a LiDAR device, including the laser scanning device.

The present disclosure further discloses a scanning method of the LiDAR device, further including: providing a transceiver assembly including a laser emitting unit and a laser receiving unit; rotating a scanning prism with a plurality of scanning mirror surfaces about a scanning axis; projecting a laser beam by the laser emitting unit to the scanning mirror surfaces, and generating scanning lines by rotating the scanning mirror surfaces, wherein a normal of each of the scanning mirror surfaces forms a space angle with the scanning axis, and the values of the space angles each are not all the same, such that the same laser emitting unit generates the plural scanning lines.

BRIEF DESCRIPTION OF THE DRAWINGS

FIGS. 8A and 8B show schematic views of the scanning lines.

FIG. 12A shows a schematic structural view of a laser scanning device with a triangular prism.

FIGS. 12B and 12C show schematic views of a scan range on the basis of FIG. 12A.

DETAILED DESCRIPTION

The implementation process of the technical solution of the present disclosure will be described below in conjunction with specific embodiments, without limiting the present disclosure.

Inventor of present disclosure found that according to the above structure, only one scanning line may be acquired by arranging each emitter hybrid 30, i.e., if 64 scanning lines are to be acquired, 64 emitter hybrids 30 and 64 detector hybrids 32 are required to be provided, and the number of components required to be provided inside the device is large, which does not facilitate volume compression and cost reduction.

However, with increasingly wide applications of the LiDAR, application scenarios are becoming more and more sophisticated, and the volume compression and cost reduction have been commonly pursued technically in the industry.

Further, if the laser emitting units may generate the scanning lines the number of which exceeds that of laser emitting units, the number of components inside the apparatus may be decreased, and the component arrangement, volume compression and cost reduction may be facilitated.

In addition to the above-mentioned problem urgent to be solved, there also exist the following problems.

Figure 1:
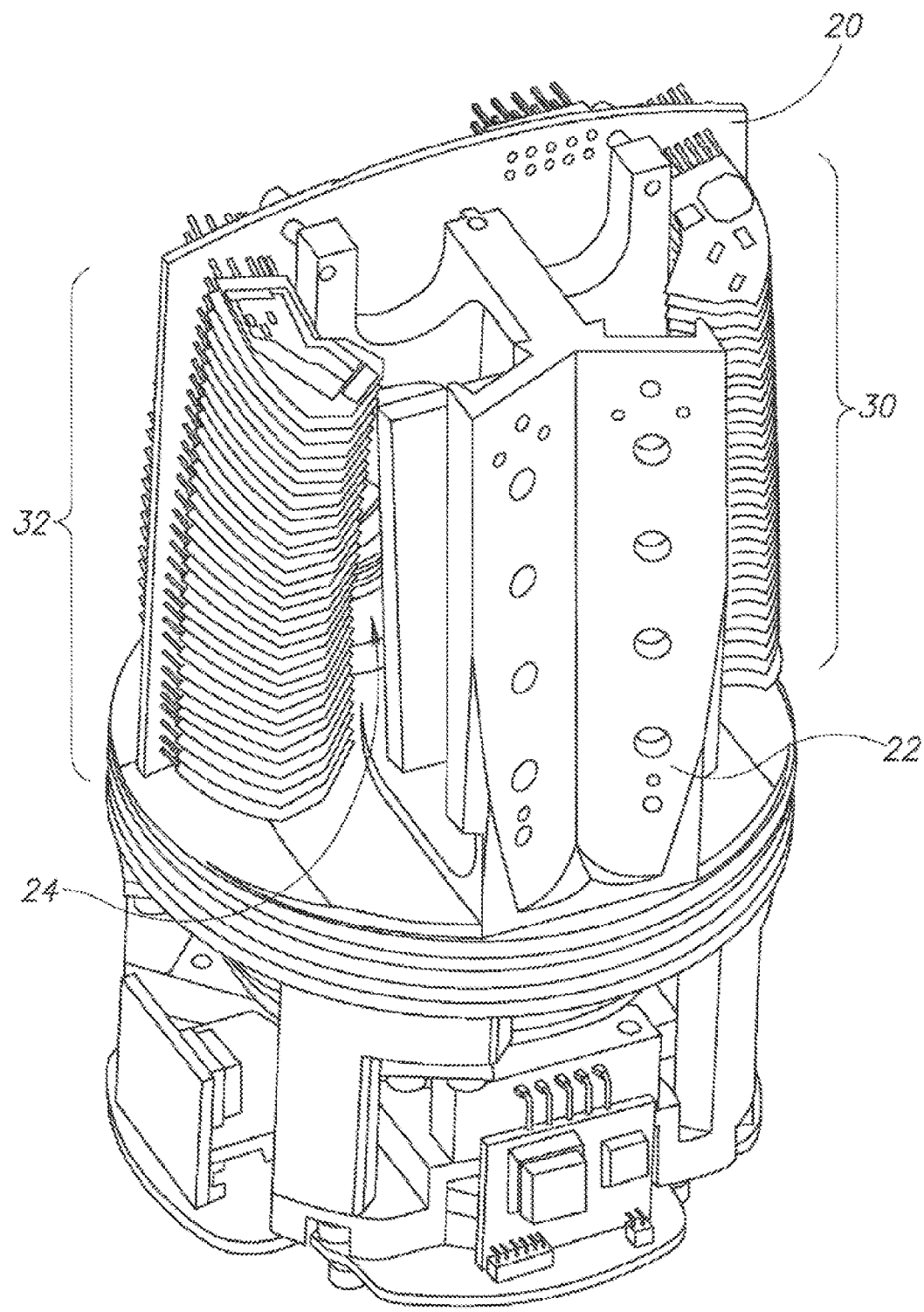
FIG. 1 shows a schematic view of a scanning device in a LiDAR of U.S. Pat. No. 8767190B2.
Figure 2:
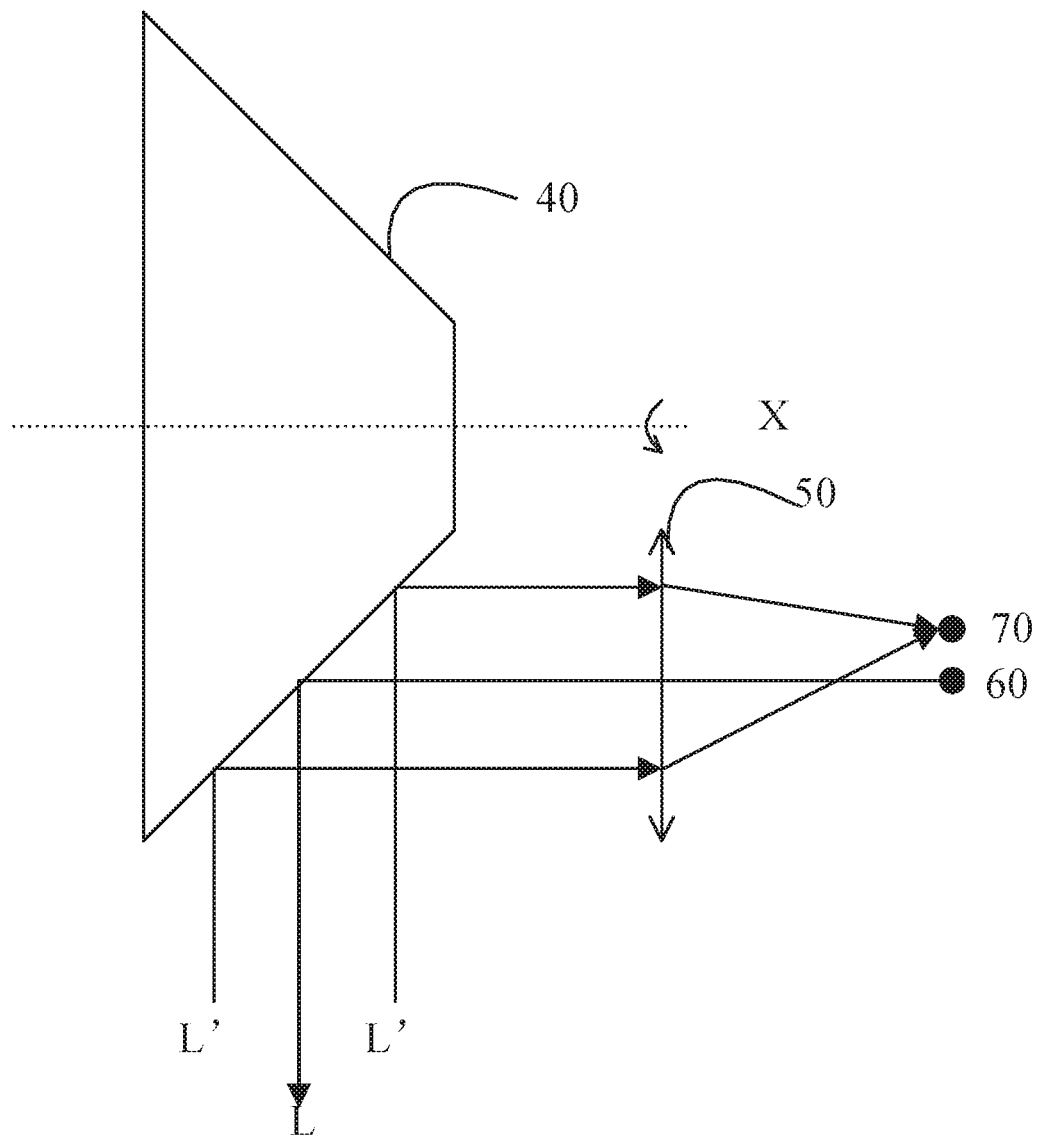
FIG. 2 is a schematic structural view of a laser scanning device in a prior art.

In the technical solution of the prior art, the scanning field of view is rather limited. Taking FIG. 2 as an example, an effective scanning field of view is less than 90 degrees. How to further expand the scanning field of view to adapt to a more diverse practical demanding scenarios is a problem to be solved urgently at present.

Figure 3A:
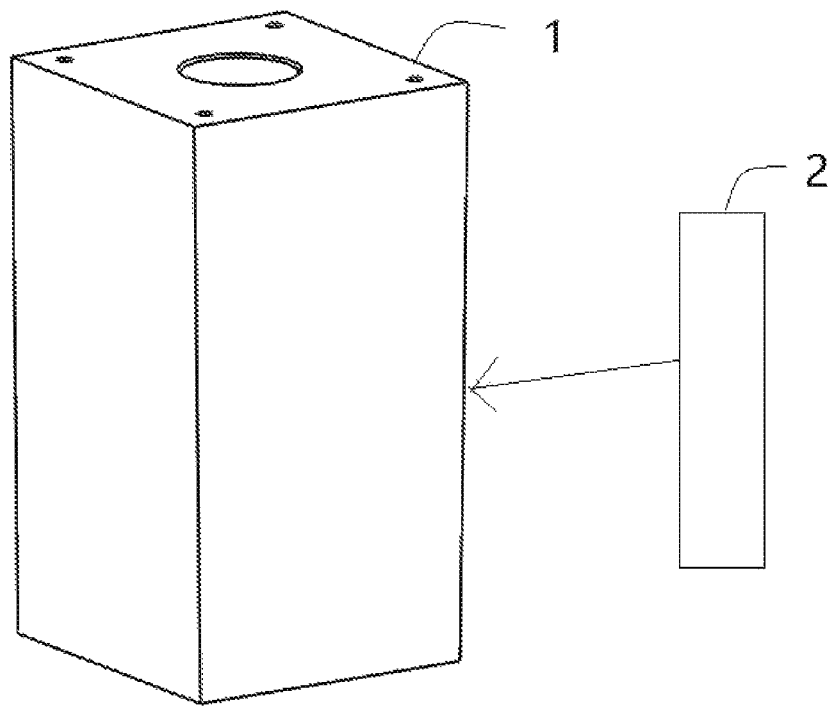
FIGS. 3A and 3B show schematic views of a main structure of a laser scanning device according to the present disclosure.
Figure 3B:
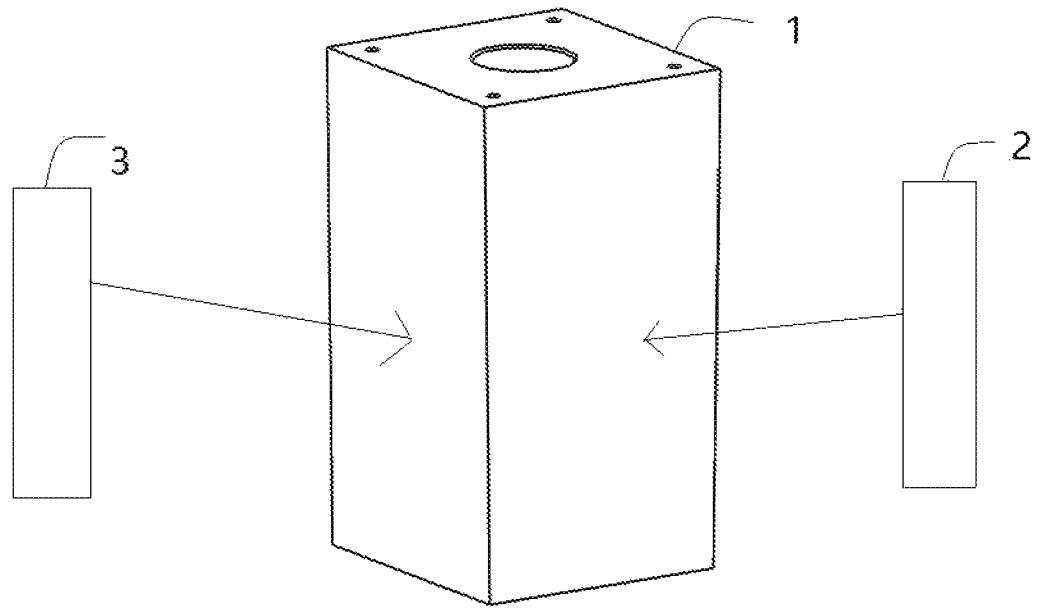
Figure 4:
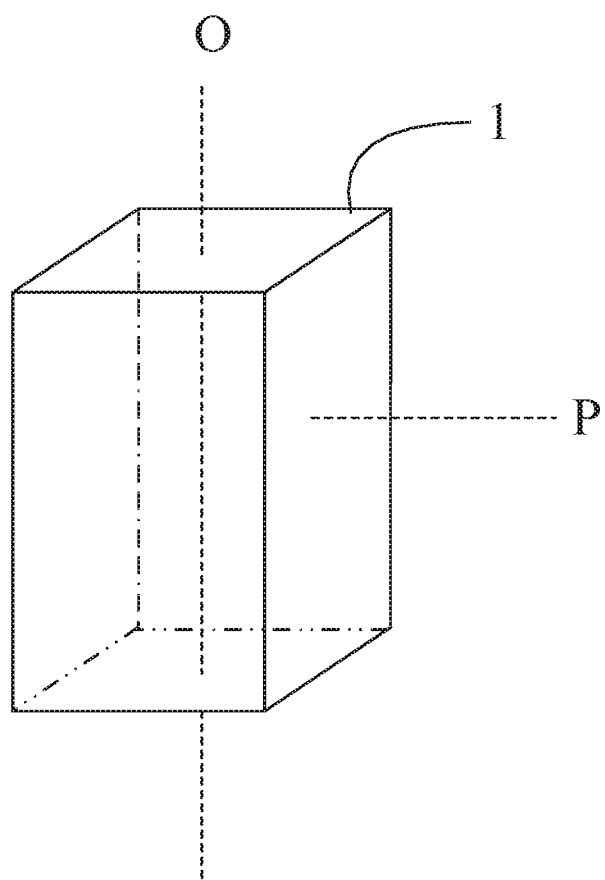
FIG. 4 shows a schematic view of a main structure of a scanning prism according to the present disclosure.

FIGS. 3A and 3B show schematic views of a main structure of a laser scanning device according to the present disclosure. FIG. 4 shows a schematic view of a main structure of a scanning prism according to the present disclosure. In order to clearly demonstrate technical improvements of the present disclosure, structures of well-known parts, such as a component for scanning driving, or the like, are not shown in the drawings.

As a main optical structure of the LiDAR device, the laser scanning device is an optical basis for achieving laser scanning. In addition to the laser scanning device, the LiDAR device further includes other well-known components, such as processing module a battery module, or the like.

As shown in FIG. 3A, the laser scanning device according to the present disclosure includes a scanning prism 1 and a transceiver assembly 2.

The scanning prism 1 may include a plurality of scanning mirror surfaces, all of which rotate about a scanning axis O. Specifically, the scanning prism 1 may include three, four, five or six scanning mirror surfaces, and the following description will be made by taking four scanning mirror surfaces as an example.

Each transceiver assembly includes a laser emitting unit and a laser receiving unit. The laser beam generated by the laser emitting unit is irradiated on one scanning mirror surface, reflected by the scanning mirror surface and then emitted outside of the LiDAR device. With rotation of the scanning prism 1, an angle between a normal of the scanning mirror surface and a horizontal plane remains unchanged, but a position of the scanning mirror surface in the horizontal direction is successively changed so that a reflection direction of the laser beam is successively changed such that a scanning line may be generated.

In addition, the normal of each of the scanning mirror surfaces forms a space angle with the scanning axis. If all the space angles are identical, the scanning lines generated from the same laser emitting unit via the reflection of the different scanning mirror surfaces coincide with each other, i.e., only one scanning line is generated actually. However, in the present disclosure, the space angles are not all the same, and for the same laser emitting unit, the angles between the normals of the different scanning mirror surfaces and the horizontal plane are not all the same. Accordingly, during the rotation process of the scanning prism 1, the scanning lines generated from the same laser emitting unit via the reflection of the different scanning mirror surfaces do not completely coincide with each other, that is, a plurality of scanning lines may be generated.

Specifically, as shown in FIG. 4, the scanning prism 1 has four scanning mirror surfaces, each of which has a normal P. The scanning axis O and the normal P of each scanning mirror surface form one space angle, and a total of four space angles are formed. The four space angles ∠1, ∠2, ∠3 and ∠4 are not all the same.

In other words, the four space angles may be different from each other, i.e., there are not two identical angels among the space angles ∠1, ∠2, ∠3 and ∠4. Specifically, the four space angles preferably have a relationship of being sequentially decremented by the same angular difference. For example, the angular difference is 1°, and the four space angles may be 91°, 90°, 89° and 88°, respectively, so as to facilitate the uniform distribution of the scanning lines generated by the same laser emitting unit via the reflection of the different scanning mirror surfaces.

Figures 5A, 5B, 5C, 5D, 5E:
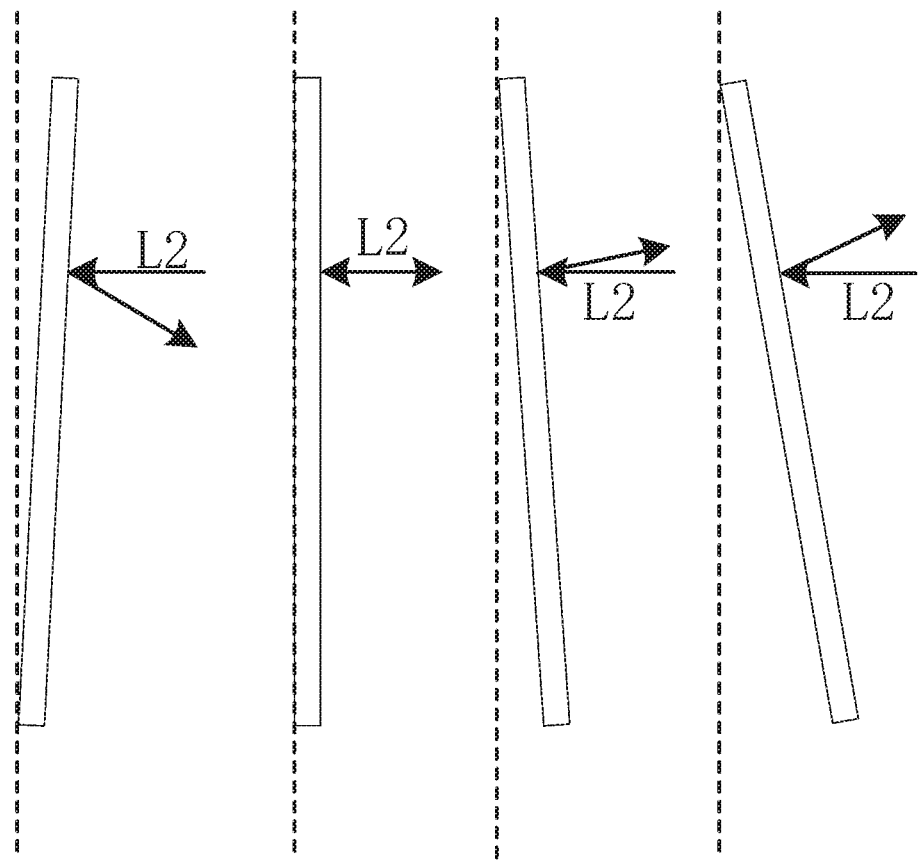
FIGS. 5A-5D show schematic sectional views of scanning mirror surfaces at various space angles.
FIG. 5E shows a schematic view of scanning lines generated by the scanning mirror surfaces in FIGS. 5A-5D.

FIG. 5A shows a schematic sectional view of the scanning mirror surface having the space angle of 91°, an upper end of the scanning mirror surface being inclined apart from the scanning axis.

FIG. 5B shows a schematic sectional view of the scanning mirror surface having the space angle of 90°, the scanning mirror surface being parallel to the scanning axis.

FIG. 5C shows a schematic sectional view of the scanning mirror surface having the space angle of 89°, an upper end of the scanning mirror surface being inclined slightly close to the scanning axis.

FIG. 5D shows a schematic sectional view of the scanning mirror surface having the space angle of 88°, an upper end of the scanning mirror surface being inclined closer to the scanning axis on the basis of FIG. 5C.

FIGS. 5A-5D show schematic views in which the scanning mirror surfaces with all the space angles rotate to face the transceiver assembly 2 respectively. The position of the transceiver assembly 2 relative to the scanning axis is fixed, the laser beam of the transceiver assembly is emitted at a fixed position and angle. Since directions of the normals of the four scanning mirror surfaces are different, light rays are reflected in different directions. When the scanning mirror surfaces 2 rotate about the scanning axis 1, the scanning lines S1, S2, S3 and S4 differently distributed spatially may be generated correspondingly. As shown in FIG. 5E, the scanning lines S1, S2, S3 and S4 keep extending substantially in the horizontal direction, and the four scanning lines are arranged in a vertical direction.

The scanning line S1 is the schematic scanning line generated by the scanning mirror surface with the space angle of 88° in FIG. 5D, the scanning line S2 is the schematic scanning line generated by the scanning mirror surface with the space angle of 89° in FIG. 5C, the scanning line S3 is the schematic scanning line generated by the scanning mirror surface with the space angle of 90° in FIG. 5B, and the scanning line S4 is the schematic scanning line generated by the scanning mirror surface with the space angle of 91° in FIG. 5A.

Therefore, even when the transceiver assembly 2 has only one laser emitting unit, the emitted emergent light beam may generate four scanning lines with rotation of the multi-surface scanning mirror surface, and the number of the scanning lines of the LiDAR device is increased.

In another embodiment, the four space angles of the scanning prism 1 are the same partially, for example, ∠1=∠2=∠3, and ∠1≠∠4; alternatively, ∠1=∠2, ∠3=∠4, and ∠1≠∠3; alternatively, ∠1=∠2, ∠1≠∠3, ∠1≠∠4, and ∠3≠∠4.

In the case where ∠1=∠2=∠3 and ∠1≠∠4, falling points of the scanning lines generated by the scanning mirror surfaces corresponding to the space angles ∠1, ∠2 and ∠3 are consistent, i.e., the three scanning mirror surfaces can only generate the same one scanning line, the scanning mirror surface corresponding to the space angle ∠4 generates another scanning line, and a total of two scanning lines are generated.

Similarly, the scanning mirror surfaces with the same space angles generate the same one scanning line. In the case where ∠1=∠2, ∠3=110 4 and ∠1≠∠3, two scanning lines are generated. In the case where ∠1=∠2, ∠1≠∠3, ∠1≠∠4 and ∠3≠∠4, three scanning lines are generated.

Figure 5F:
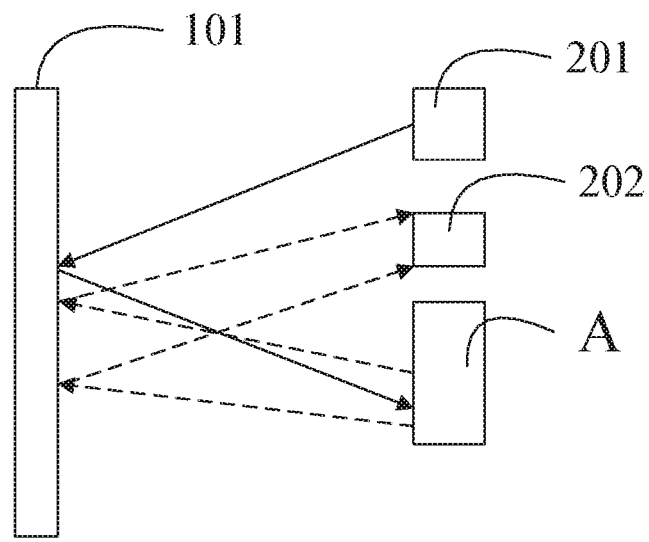
FIG. 5F shows a schematic view of a light path of a transceiver assembly relative to one scanning mirror surface.

In addition, the same scanning mirror surface not only reflects the laser beams, but also receives a signal light returned after the laser beams are irradiated on a target in an environment, and reflects the signal light to the laser receiving unit corresponding to the laser emitting unit emitting the laser beams, thereby completing the laser scanning. Referring to FIG. 5F, the scanning mirror surface 101 of the scanning prism reflects the laser beam emitted by the laser emitting unit 201 in the transceiver assembly 2 to the target A, the signal light (a dotted line in FIG. 5F) generated by diffuse reflection of the target A is reflected by the scanning mirror surface 101, and then received by the laser receiving unit 202 used together with the laser emitting unit 2, and thus laser scanning is achieved. As such, the present disclosure adopts a parallel optical path design in which the emergent light and the incident signal light share the same one scanning surface, so that an optical path is bent fewer number of times, with a small error, and collects the light rays more accurately, with a high system efficiency. In addition, for the LiDAR device, the laser may be considered to be emitted in synchronization with the reception of the signal light, and synchronous scanning is achieved.

In the transceiver assembly 2, a plurality of laser emitting units and the same number of laser receiving units as the laser emitting units may be provided. Emission elevation angles of the laser beams of the laser emitting units each are different one another, and the emission elevation angle is an angle between each the laser beam and the horizontal plane. The transceiver assembly 2 further includes a lens group (not shown) to collimate the laser beams and the signal lights.

Figure 6A:
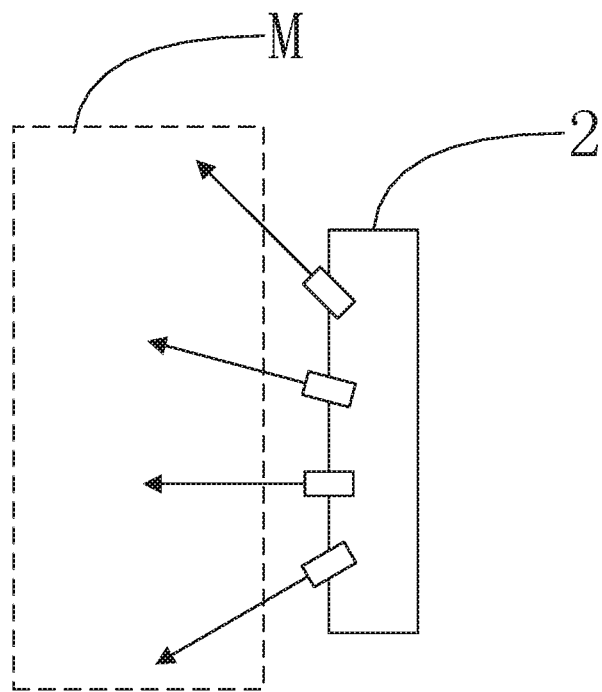
FIG. 6A shows a schematic view in which laser beams are arranged in a divergent state.
Figure 6B:
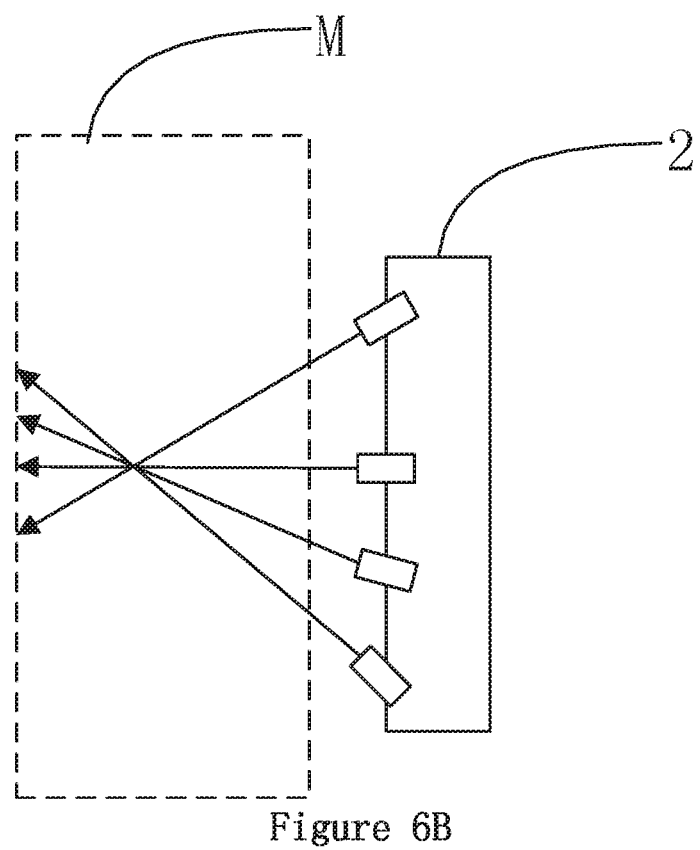
FIG. 6B shows a schematic view in which the laser beams are arranged in a convergent state.

The four laser emitting units are taken as an example. There may also be other numbers, such as eight, and the number is not limited thereto. As shown in FIGS. 6A and 6B, the four laser emitting units are arranged vertically, all the laser beams of the four laser emitting units are located in the same emergent plane M, and the laser beams in the same transceiver assembly have different emission elevation angles. In the case where the four space angles are different each other, the four laser emitting units may generate sixteen scanning lines. The four laser beams of FIG. 6A are arranged in a divergent state, and the four laser beams of FIG. 6B are arranged in a convergent state.

In another embodiment, the laser scanning device may also include two transceiver assemblies 2, 3.

The laser beams generated by the respective laser emitting units of the two transceiver assemblies are reflected by different scanning mirror surfaces and then emitted outside of the laser scanning device. As shown in FIG. 3B, the laser beam generated by the transceiver assembly 2 and the laser beam generated by the transceiver assembly 3 are irradiated on two scanning mirror surfaces of the scanning prism 1 respectively, then reflected, emitted outside of the laser scanning device, and then emitted outside of the LiDAR device.

Figure 7A:
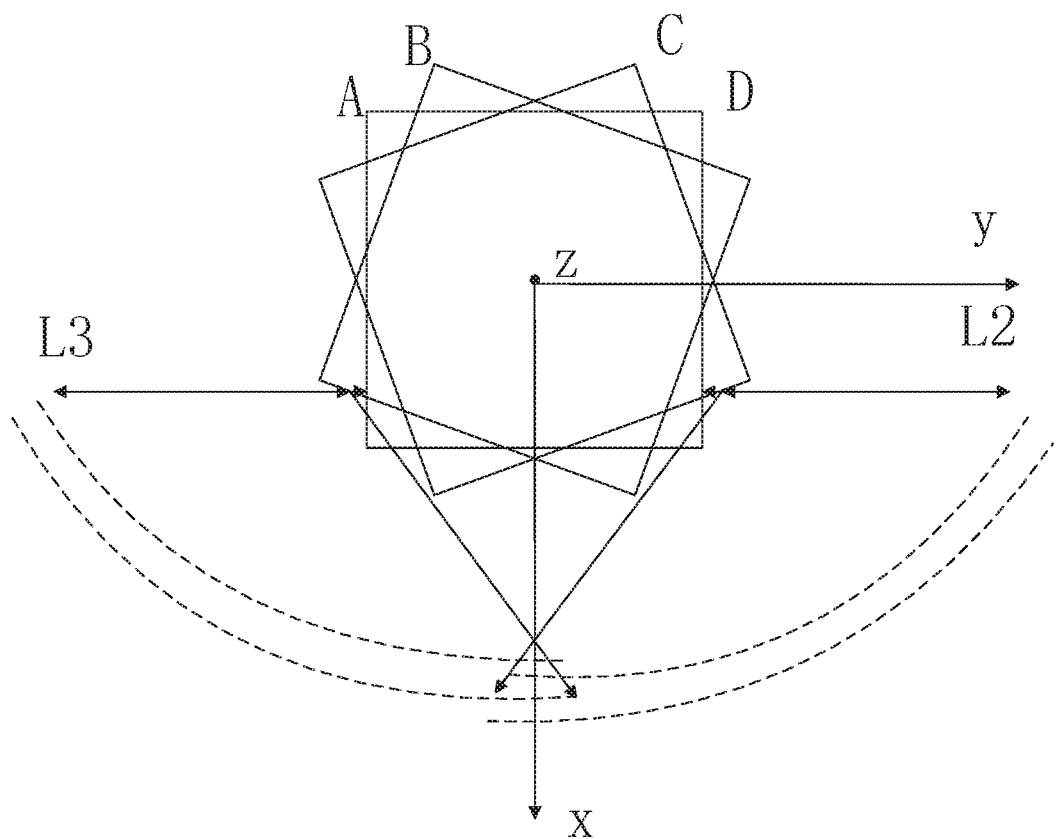
FIG. 7A shows a schematic overall view of a rotating field of view of the scanning prism.

FIG. 7A shows a schematic overall view of a rotating field of view of the scanning prism 1, and is a top view of FIG. 3B. FIGS. 7B-7E show schematic stepwise views of the rotating field of view of FIG. 7A.

A coordinate system is established with a center point of a section of the scanning axis O inside the scanning prism 1 as an origin, wherein the scanning axis O is a z axis, and an x axis and a y axis are established in the horizontal plane. The same vertex of the scanning prism 1 rotates and passes through four positions A, B, C and D sequentially when the scanning prism 1 is rotated clockwise, i.e., experiences the situations shown in FIGS. 7B-7E successively.

Figure 7B:
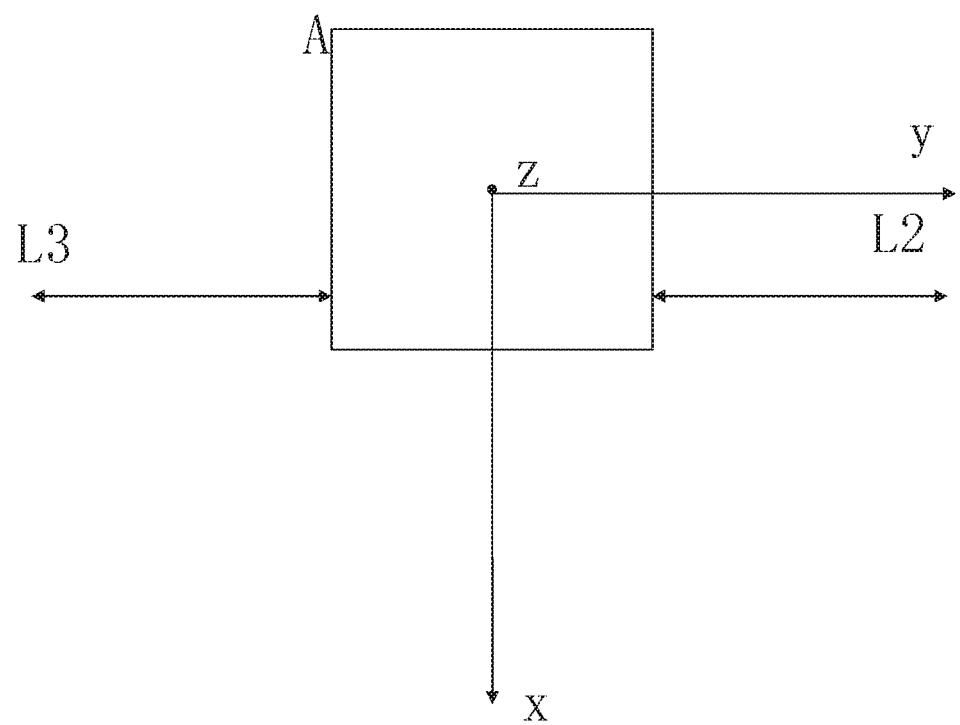
FIGS. 7B-7E show schematic stepwise views of the rotating field of view of FIG. 7A.
Figure 7C:
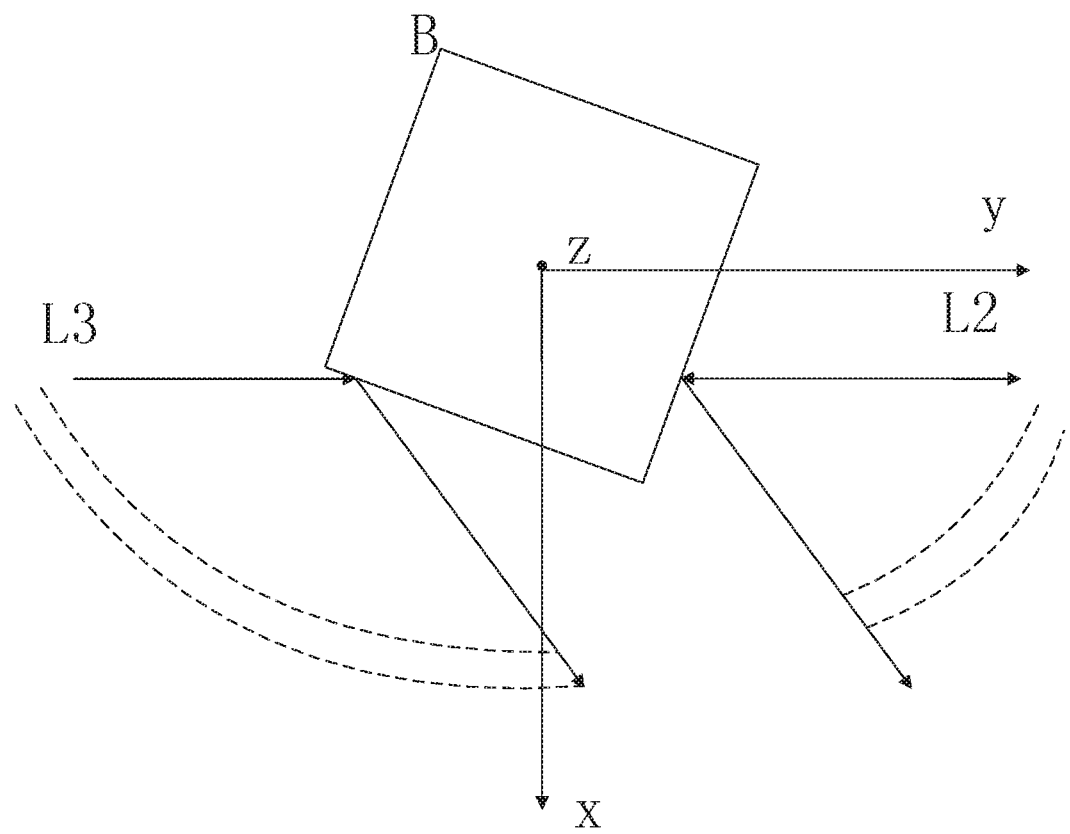
Figure 7D:
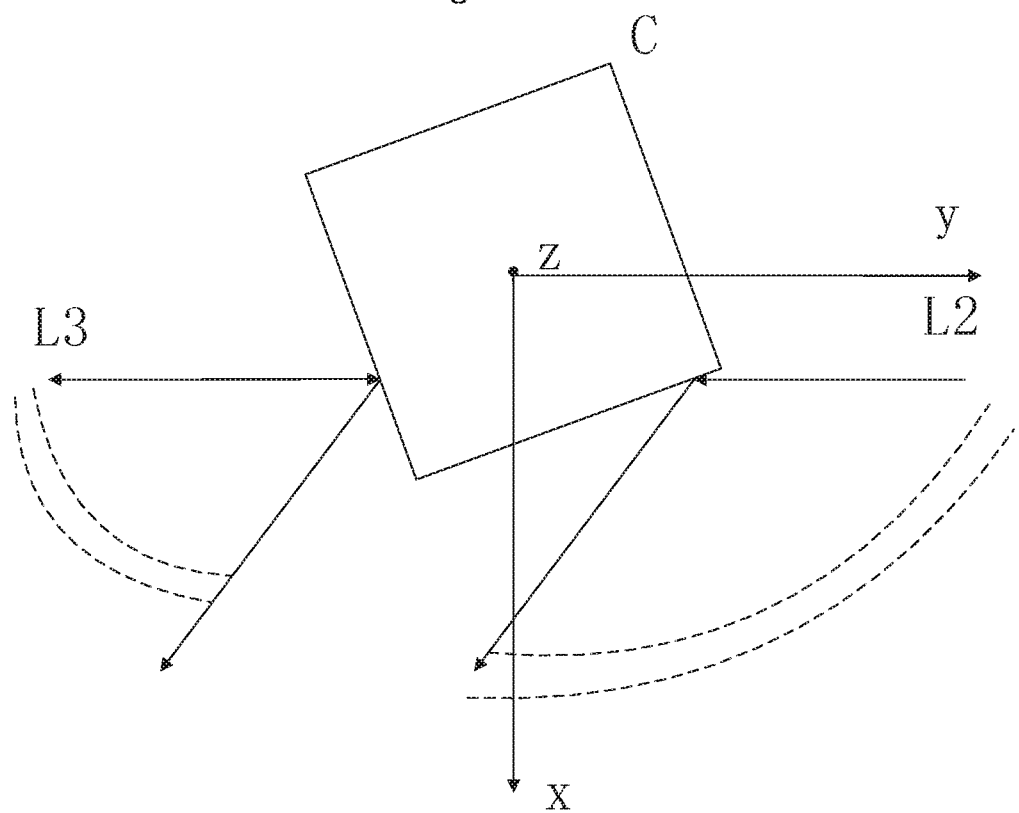
Figure 7E:
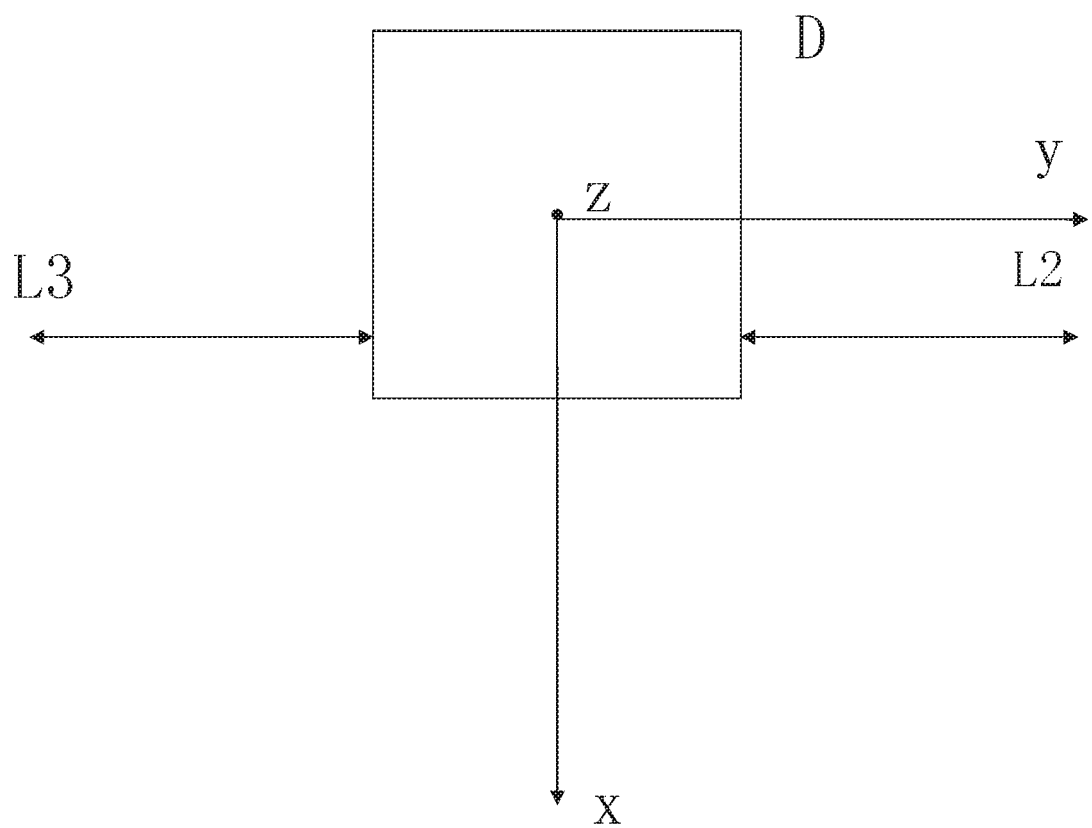

As shown in FIG. 7B, A represents an initial position at which the scanning prism 1 is arranged vertically, B represents a position at which the scanning prism 1 is rotated relative to A by an angle less than 45 degrees, C represents a position at which the scanning prism 1 is rotated relative to A by an angle greater than 45 degrees and less than 90 degrees, and D represents a position at which the scanning prism 1 is rotated relative to A by 90 degrees.

The transceiver assemblies 2, 3 are located on two sides of the scanning prism 1 respectively, the transceiver assembly 2 generates the laser beam L2, and the transceiver assembly 3 generates the laser beam L3. Both the laser beam L2 and L3 are parallel to the y axis.

When the scanning prism 1 is located at the position A, the laser beam L2 is incident on the scanning mirror surface perpendicularly, and is reflected back along the original path. With rotation of the scanning prism 1, when the scanning prism is located at the position B, a scan range of the transceiver assembly 2 is advanced towards the −y-axis direction with respect to the position A. When the scanning prism 1 is located at the position C, the scanning prism 1 has been rotated by more than 45 degrees relative to the position A, the reflected light is rotated by more than 90 degrees, and the scan range is across the x axis, covering a field of view belonging to the −y axis, and reaching a boundary of a field of view of the transceiver assembly 2 for one side of the scanning mirror surface. As the scanning prism 1 keeps rotating to the position D, a scanning process for the adjacent scanning mirror surface is started, and is a repetition of the scanning process for the positions A-C.

When the scanning prism 1 is located at the position A, the laser beam L3 is incident on the current scanning mirror surface perpendicularly, and is reflected back along the original path. As the scanning prism 1 is rotated to the position B, the laser beam L3 is incident on the adjacent scanning mirror surface and reaches a boundary of a field of view of L3 for one side of the adjacent scanning mirror surface, and the boundary of the field of view is across the x axis, covering the field of view belonging to the +y axis. When the scanning prism 1 is rotated to the position C, the scan range of the transceiver assembly 3 withdraws towards the −y-axis direction with respect to the position B. As the scanning prism 1 keeps rotating to the position D, the scanning process for the next scanning mirror surface is started, and is a repetition of the scanning process for the positions A-C.

At the positions A, D, the laser beams L2 and L3 are incident onto two opposite scanning mirror surfaces respectively, and at the positions B,C, the laser beams L2 and L3 are incident onto two adjacent scanning mirror surfaces respectively.

According to the above description about the scanning situation, since the two transceiver assemblies are disposed in the laser scanning device simultaneously, and each of the transceiver assemblies achieves reflection via different scanning mirror surfaces, each of the transceiver assemblies scans back and forth in respective scanning fields of view, and the scanning fields of view of different transceiver assemblies are not all the same in the horizontal direction, thereby expanding the horizontal field of view of the laser scanning device. Specifically, dotted portions in FIG. 7A illustrate the scanning field-of-view ranges of the two transceiver assemblies 2, 3 with one laser beam as an example respectively. From FIG. 7A, it can be seen that the scanning fields of view of the two transceiver assemblies are overlapped partially in the vicinity of the x axis, i.e., the fields of view of the two transceiver assemblies are abutted upon each other, and the horizontal field of view is expanded in the horizontal direction.

In the present disclosure, the two-dimensional scanning is implemented by using the scanning prism which rotates one-dimensionally in cooperation with changes in the space angles of all scanning surfaces. The scan range covers two directions at the same time, and the goal of increasing the scan range is achieved with an elaborate scanning structure, such that the scanning process is simple and efficient.

In addition, in one embodiment, the laser emitting unit(s) of a portion of the transceiver assemblies is located above the laser receiving unit, and the laser receiving unit(s) of the other portion of the transceiver assemblies is located above the laser emitting unit. That is, the laser emitting unit of the transceiver assembly 2 is located above the laser receiving unit, and the laser receiving unit of the transceiver assembly 3 is located above the laser emitting unit, such that signals are received accurately, and errors are avoided.

Figures 8A, 8B:
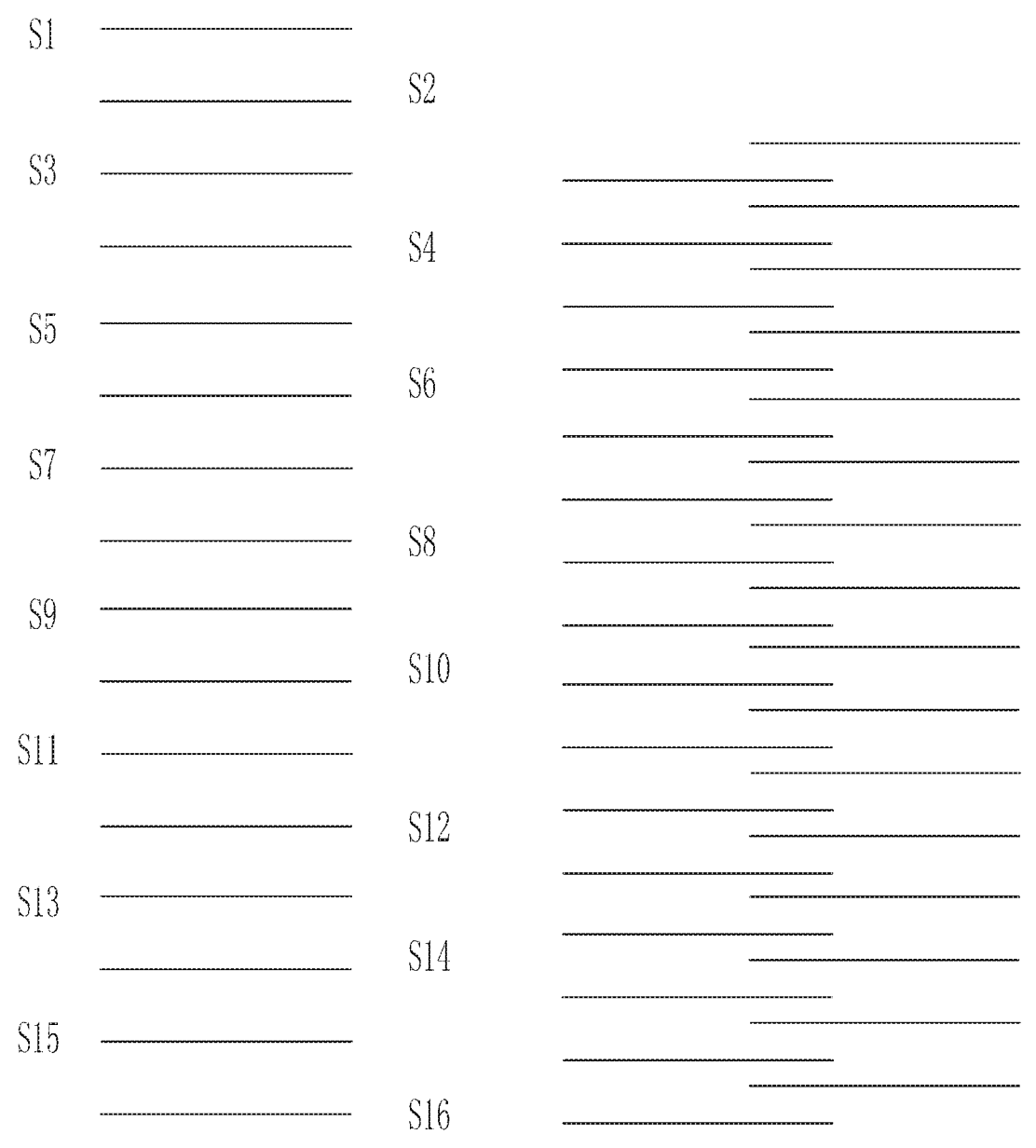

Further, FIG. 8A is a schematic view of the scanning lines of the transceiver assembly 2 in the case where four laser emitting units are provided, four space angles of the scanning prism are different one another, and the emission elevation angles of the four laser emitting units are also different one another. At this point, there are 4×4 scanning lines, i.e., scanning lines S1-S16.

In actual operations, the positions where the scanning lines are arranged may be adjusted according to the emission elevation angle of the laser beam of each of the laser emitting units, specific value of the space angle of each of the scanning mirror surfaces, and spatial-attitude angles of the transceiver assemblies relative to the scanning axis. For example, by adjusting the specific value of the emission elevation angle, some of the scanning lines are overlapped. Axial heights of the two transceiver assemblies 2, 3 along the scanning axis of the scanning prism may be set to be the same or different, the transceiver assemblies 2, 3 may have the same number of the laser emitting units, and may be vertically arranged, and the emission elevation angles of the laser emitting units at corresponding positions in the two transceiver assemblies may be the same or different one another, so as to adjust the arrangement of the scanning lines. The overall elevation angles of each of the transceiver assemblies may be set to be the same as or different from that of other transceiver assemblies, so as to adjust the arrangement of the scanning lines, and the overall elevation angles are angles between the whole transceiver assemblies and the horizontal plane. The spatial-attitude angles may include, but are not limited to, the axial heights of the transceiver assemblies along the scanning axis, the emission elevation angles, and orienting directions.

Other arrangements of the scanning lines are obtained by adjusting the emission elevation angle of each of the laser emitting units, the spatial angle of each of the scanning mirror surfaces and the specific value of the spatial-attitude angle of each of the transceiver assemblies according to actual needs, which falls within the disclosed scope of the present disclosure.

In the case where some of the four space angles are the same, but not all the same, similarly, reference may be made to the foregoing technical solution, more than four scanning lines may still be generated, such that the number of the scanning lines is greater than that of the laser emitting units.

The above shows the case of the scanning lines generated on the side of the transceiver assembly 2, and the same principle applies to the side of the transceiver assembly 3. In cooperation with the solution of FIG. 7A, assuming that the transceiver assemblies 2, 3 each include four laser emitting units, and the eight laser emitting units have different emission elevation angles from each other, i.e., there is an angle between any two laser beams among the laser beams. At this point, the transceiver assemblies 2, 3 each generate sixteen scanning lines, the scanning fields of view are partially overlapped, and the scanning lines in the overlapping portion are staggered from each other, so that the number of the scanning lines in the overlapping portion is doubled, and data obtained in the field-of-view area of the overlapping portion will be more abundant and sufficient.

Other arrangements of the scanning lines may also be obtained by adjusting the emission elevation angle of each of the laser emitting units of each of the transceiver assemblies 2, 3, the specific value of the space angle of each of the scanning mirror surfaces, the specific position where each of the transceiver assemblies is disposed, and the projection direction of the laser beam of each the transceiver assemblies according to actual needs, which falls within the disclosed scope of the present disclosure.

The transceiver assembly may also include other numbers of laser emitting units, which is also within the disclosed scope of the present disclosure.

In addition, in some embodiments, the laser beams of the laser emitting units of the transceiver assemblies 2, 3 may keep the same horizontal angle α with respect to the y axis, i.e., the transceiver assemblies 2, 3 are symmetrically disposed relative to the scanning axis.

Figure 9:
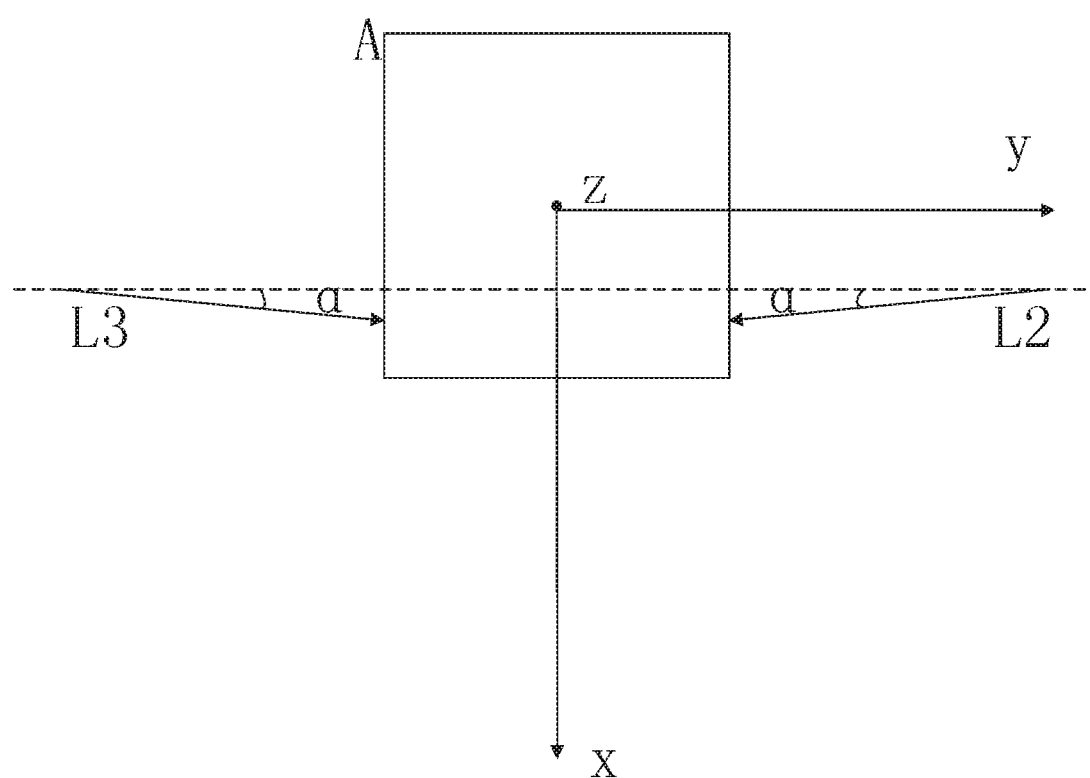
FIG. 9 shows a schematic structural view of a laser scanning device with two transceiver assemblies.

Referring to FIG. 9, a dashed line is kept being parallel to the y axis. In addition, the laser beams of the laser emitting units of the transceiver assemblies 2, 3 may also keep different horizontal angles with respect to the y axis, i.e., the orienting directions of the transceiver assemblies relative to the scanning axis may be different. By setting the specific values of the horizontal angles, the range and position of the overlapped field of view may be controlled.

In the above technical solutions, two transceiver assemblies are provided, and more transceiver assemblies may also be provided in the present disclosure to further expand the field of view in the horizontal direction.

Firstly, as shown in FIG. 3B, the number of the transceiver assemblies provided on each side may be further expanded. For example, a transceiver assembly 3' is disposed right above the transceiver assembly 3, and projection directions, scanning processes and utilized scanning surfaces of the laser beams are all the same as those of the transceiver assembly 3, to increase the number of the scanning lines. Similarly, a transceiver assembly 2' may be disposed right above the transceiver assembly 2 for use in cooperation with the transceiver assembly 3'.

Figure 10:
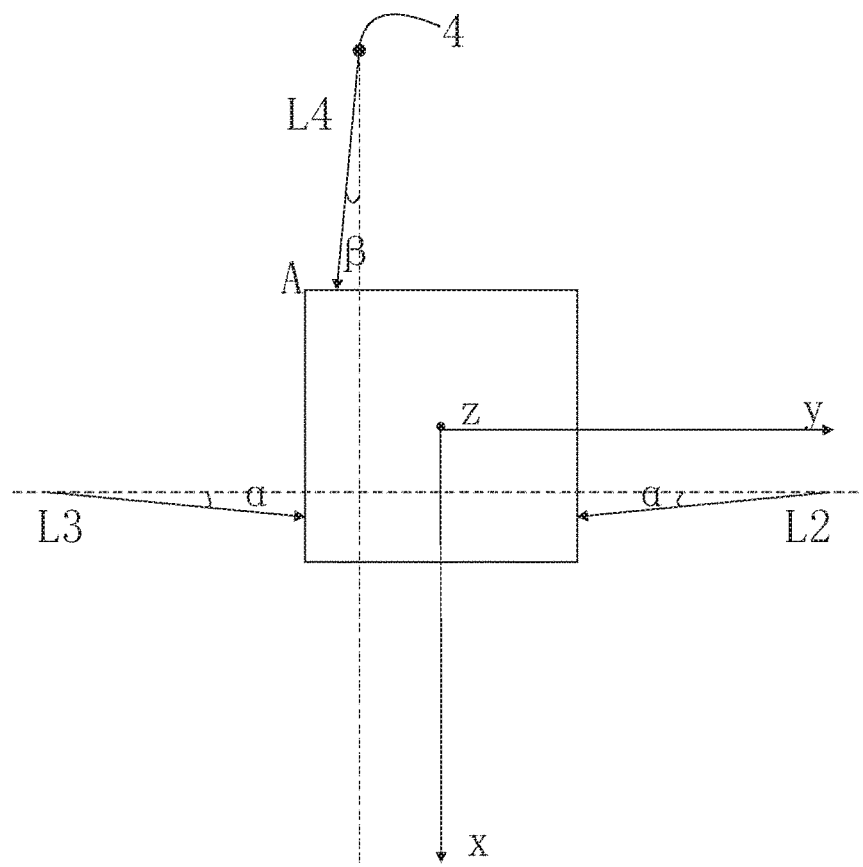
FIG. 10 shows a schematic structural view of a laser scanning device with three transceiver assemblies.

In another embodiment, as shown in FIG. 10, a third transceiver assembly 4 which generates a laser beam L4 may further be provided on the basis of the embodiment shown in FIG. 9. In order to prevent the transceiver assembly 3 itself from shielding the field of view of the laser beam L4, the transceiver assemblies 3 and 4 may be disposed at different heights relative to the scanning axis.

As in the above-mentioned embodiments, the field of view of the third transceiver assembly 4 is mainly located in the −x−y region, thereby expanding the field of view of the laser scanning device in the horizontal direction.

By selecting a specific value of a horizontal angle β between the laser beam L4 and a parallel line of the x axis, or by integrally selecting the values of α and β in FIG. 10, and setting the emission elevation angles of the laser beams, the specific value of the space angle of each of the scanning mirror surfaces and the specific values of the positions of the transceiver assemblies according to the optical principle and actual needs, the scanning fields of view of the transceiver assemblies 3, 4 may be abutted upon each other or coincide, and the fields of view of the transceiver assemblies 2, 3, 4 are abutted upon each other successively to form a complete field of view which covers the horizontal field of view, located between 180 degrees and 270 degrees, thereby further improving the scanning capability and efficiency of the laser scanning device.

Figure 11:
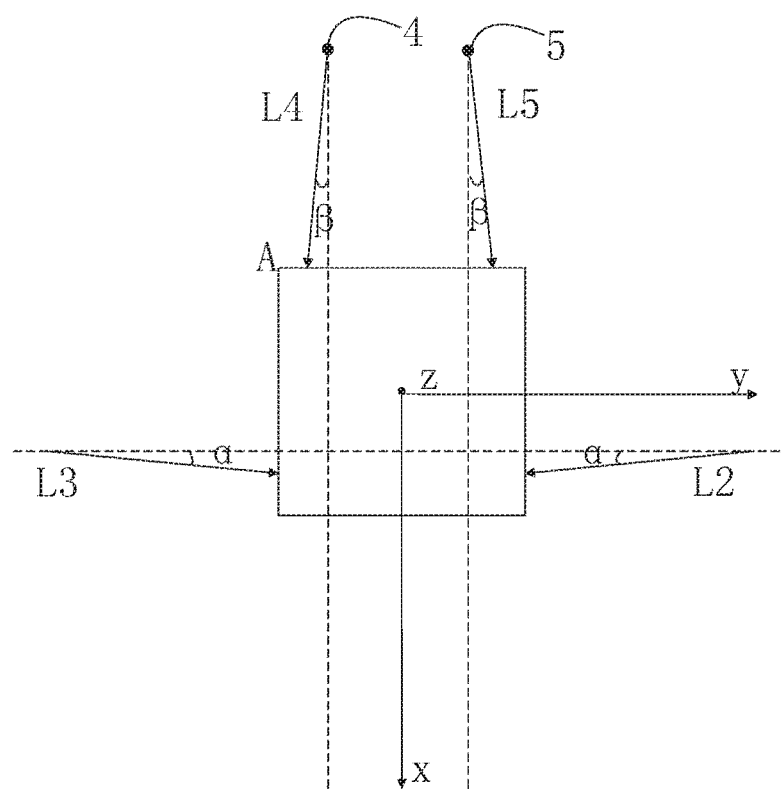
FIG. 11 shows a schematic structural view of a laser scanning device with four transceiver assemblies.

Similarly, as shown in FIG. 11, a fourth transceiver assembly 5 may further be provided on the basis of the embodiment shown in FIG. 10, the field of view of which is mainly located in the −x+y region, thereby expanding the field of view of the laser scanning device in the horizontal direction.

By selecting a specific value of a horizontal angle β between the laser beam L5 and the parallel line of the x axis, or by integrally selecting the values of α and β in FIG. 11, and selecting other parameters, the scanning fields of view of the transceiver assemblies 2, 5 may be abutted upon each other or coincide, and the fields of view of the transceiver assemblies 2, 3, 4, 5 are abutted upon each other successively to form a complete field of view which covers the horizontal field of view, located between 270 degrees and 360 degrees, thereby further improving the scanning capability and efficiency of the laser scanning device.

The number and position of the transceiver assemblies can be set in other manners according to actual needs, and are all within the disclosed scope of the present disclosure.

As the scanning prism 1 of the present disclosure, a multi-surface scanning mirror surface stated in CN201720413010.7 may also be used.

In addition, based on the above-mentioned structure, the present disclosure further discloses a scanning method, including:

providing a transceiver assembly including a laser emitting unit and a laser receiving unit;

rotating a scanning prism with a plurality of scanning mirror surfaces about a scanning axis; and projecting a laser beam by the laser emitting unit to the scanning mirror surfaces, and rotating the scanning mirror surfaces to generate scanning lines, wherein a normal of each of the scanning mirror surfaces forms a space angle with the scanning axis, and the values of all the space angles are not all the same, such that the same one laser emitting unit generates the plural scanning lines.

Further, the scanning mirror surface reflects, to the laser receiving unit corresponding to the laser emitting unit generating the scanning line, a signal light corresponding to the scanning line and returned by a target.

At least two transceiver assemblies are provided, and the scanning fields of view of the transceiver assemblies are partially overlapped.

Or, at least three transceiver assemblies are disposed around the scanning prism, and the fields of view of all the transceiver assemblies are abutted upon each other successively to form a continuous field of view.

The emergent light generated after the laser beam projected by the laser emitting unit towards the scanning prism is reflected conforms to the following formula:

$$H\_Angle = \begin{cases} 2*theta + alpha & (0 \leq theta < 360/N) \\ 2*(theta - 360/N) + alpha & (360/N \leq theta < 2*360/N) \\ 2*(theta - 2*360/N) + alpha & (2*360/N \leq theta < 3*360/N) \\ M & \\ 2*(theta - (N-1)*360/N) + alpha & ((N-1)*360/N \leq theta < N*360/N) \end{cases} \quad (1)$$

$$V\_Angle = Lidar\_Angle(Lidar\_NUM) + Mirror\_Angle \quad (2)$$

$$X = Range * cos(V\_Angle * D2Rad) * cos(H\_Angle * D2Rad) \quad (3)$$

$$Y = Range * cos(V\_Angle * D2Rad) sin(-H\_Angle * D2Rad) \quad (4)$$

$$Z = Range * sin(V\_Angle * D2Rad) \quad (5)$$
$$D2Rad = 3.1415/180.0$$

wherein H_Angle is an angle between a projection of the emergent light in the horizontal plane and the x axis, V_Angle is an angle between the emergent light and the horizontal plane, N is the number of the scanning mirror surfaces of the scanning prism, Lidar_NUM is a serial number of the laser emitting unit, and Lidar_Angle (Lidar_NUM) is an angle between the laser beam of the laser emitting unit with the serial number of Lidar_NUM and the horizontal plane, i.e., the emitting emission elevation angle. Mirror_Angle is an angle between the normal of the scanning mirror surface generating the emergent light and the horizontal plane, i.e., a mirror surface dip angle. Alpha is an angle between the x axis and the projection of the emergent light in the horizontal plane in a clockwise direction when a rotation angle of the scanning prism is O, and Range is a ranging value of the emergent light measured by the LiDAR device. D2Rad is a constant, and X, Y, and Z are three-dimensional coordinates of the target reflecting the emergent light respectively. When the scanning prism rotates clockwise, theta is the rotation angle of the scanning prism, and when the scanning prism rotates counterclockwise, theta is 360—the rotation angle of the prism. The rotation angle of the scanning prism may be obtained by reading data of rotation of a coded disc of the scanning prism, ranging from 0 to 360. The mirror surface dip angle of each scanning mirror surface is given, and meanwhile each emission elevation angle is also given.

The above formulas (1), (2) are used for calculating angle parameters of the emergent light at any time when the scanning prism keeps rotating. The above formulas (3)-(5) are used for calculating position data of the target to which the emergent light is projected at any time when the scanning prism keeps rotating.

Taking FIG. 9 as an example, the scanning prism rotates clockwise, the scanning prism has four mirror surfaces, N=4, and FIG. 9 shows the position where the rotation angle is 0. At this point, the laser beam L2 is irradiated on the first scanning mirror surface, and the laser beam L3 is irradiated on the third scanning mirror surface. In FIG. 9, the scanning mirror surface in the +x direction is the second scanning mirror surface, and the scanning mirror surface in the −x direction is the fourth scanning mirror surface. For example, in FIG. 9, the angle α of the laser beam L2 is 30 degrees, the angle α of the laser beam L3 is also 30 degrees, and therefore the angles of the emergent lights of the laser beams L2 and L3 with respect to the x axis are 60 degrees respectively. That is, alpha of the laser beam L2 is 300 degrees, and alpha of the laser beam L3 is 60 degrees.

When the scanning prism rotates by 45 degrees, theta=45 degrees, the laser beam L2 faces the first scanning mirror surface, and the laser beam L3 faces the second scanning mirror surface, so that the H_Angle of the emergent light of the laser beam L2 is 2×45+300=390 degrees, and the H_Angle of the emergent light of the laser beam L3 is 2×45+60=150 degrees.

The V_Angle of the emergent light of the laser beam L2 is the sum of the emission elevation angle of the laser emitting unit of the laser beam L2 and the mirror surface dip angle of the first scanning mirror surface. The V_Angle of the emergent light of the laser beam L3 is the sum of the emission elevation angle of the laser emitting unit of the laser beam L3 and the mirror surface dip angle of the second scanning mirror surface.

When the scanning prism rotates by 135 degrees, theta=135 degrees, the laser beam L2 faces the fourth scanning mirror surface, the laser beam L3 faces the first scanning mirror surface, and the scanning mirror surface that actually reflects the light rays has been changed. With regard to the current scanning mirror surface that actually reflects the light rays, the H_Angle of the emergent light of the laser beam L2 is 2×(135−90)+300=390 degrees, and the H_Angle of the emergent light of the laser beam L3 is 2×(135−90)+60=150 degrees.

The V_Angle of the emergent light of the laser beam L2 is the sum of the emission elevation angle of the laser emitting unit of the laser beam L2 and the mirror surface dip angle of the fourth scanning mirror surface. The V_Angle of the emergent light of the laser beam L3 is the sum of the emission elevation angle of the laser emitting unit of the laser beam L3 and the mirror surface dip angle of the first scanning mirror surface.

When the scanning prism rotates by 225 degrees, theta=225 degrees, the laser beam L2 faces the third scanning mirror surface, and the laser beam L3 faces the fourth scanning mirror surface. Similarly, the H_Angle of the emergent light of the laser beam L2 is 2×(225−180)+300=390 degrees, and the H_Angle of the emergent light of the laser beam L3 is 2×(225−180)+60=150 degrees.

The V_Angle of the emergent light of the laser beam L2 is the sum of the emission elevation angle of the laser emitting unit of the laser beam L2 and the mirror surface dip angle of the third scanning mirror surface. The V_Angle of the emergent light of the laser beam L3 is the sum of the emission elevation angle of the laser emitting unit of the laser beam L3 and the mirror surface dip angle of the fourth scanning mirror surface.

When the scanning prism rotates by 315 degrees, theta=315 degrees, the laser beam L2 faces the second scanning mirror surface, and the laser beam L3 faces the third scanning mirror surface. Similarly, the H_Angle of the emergent light of the laser beam L2 is 2×(315−270)+300=390 degrees, and the H_Angle of the emergent light of the laser beam L3 is 2×(315−270)+60=150 degrees.

The V_Angle of the emergent light of the laser beam L2 is the sum of the emission elevation angle of the laser emitting unit of the laser beam L2 and the mirror surface dip angle of the second scanning mirror surface. The V_Angle of the emergent light of the laser beam L3 is the sum of the emission elevation angle of the laser emitting unit of the laser beam L3 and the mirror surface dip angle of the third scanning mirror surface.

The mirror surface dip angle of the mirror surface and the emission elevation angle are positive when the light rays are raised towards the +z direction along the horizontal plane, and negative when the light rays are pressed down towards the −z direction along the horizontal plane.

With the above-mentioned structure, the LiDAR device may expand the horizontal field of view, double the scanning lines due to the superimposition of partial fields of view, and obtain accurate target position information based on the structure.

The transceiver assemblies 4, 5 of FIGS. 10 and 11 also conform to the above-mentioned formulas (1)-(5).

In addition, when the scanning prism has other numbers of scanning mirror surfaces, such as a triangular prism and a pentagonal prism, the principle is the same as that of the above-mentioned quadrangular prism, and not repeated herein.

In an actual process of operation of the LiDAR device, a portion with higher data accuracy may be selected, from the current field-of-view range, as a working scanning field of view of the LiDAR device.

In conjunction with related descriptions of FIG. 7A, a method for selecting the portion with the higher accuracy as the working scanning field of view according to requirements includes:

step 1, at which the scanning prism is rotated to pass through a first angle, a second angle, a third angle and a fourth angle sequentially in a process of rotating by 360/N degrees; when the scanning prism is detected to rotate to the first angle, the signal light of the first transceiver assembly for the first scanning mirror surface is obtained;

referring to FIG. 7A, the first angle is obtained by rotating the scanning prism to the position A, the second angle is obtained by rotating the scanning prism to the position B, the third angle is obtained by rotating the scanning prism to the position C, the fourth angle is obtained by rotating the scanning prism to the position D, and N is the number of scanning mirror surfaces; the LiDAR device has a rotation detecting device configured to detect the rotation angle of the scanning prism;

step 2, at which when the scanning prism is detected to rotate to the second angle, the signal light of the second transceiver assembly for the second scanning mirror surface is obtained;

step 3, at which when the scanning prism is detected to rotate to the third angle, the signal light of the first transceiver assembly for the first scanning mirror surface is stopped obtaining; and step 4, at which when the scanning prism is detected to rotate to the fourth angle, the signal light of the second transceiver assembly for the second scanning mirror surface is stopped obtaining.

That is, the transceiver assembly 2 may obtain scanning data generated in the process of rotation from the position A to the position C. The transceiver assembly 3 may obtain scanning data generated in the process of rotation from the position B to the position D.

Under the control of the driving device, the transceiver assembly 2 may drive the laser emitting unit of the first transceiver assembly to start emitting the emergent light when the scanning prism is rotated to the position A, and stop driving the laser emitting unit of the first transceiver assembly to emit the emergent light when the scanning prism is rotated to the position C. Meanwhile, under the control of the driving device, the transceiver assembly 3 may drive the laser emitting unit of the second transceiver assembly to start emitting the emergent light when the scanning prism is rotated to the position B, and stop driving the laser emitting unit of the second transceiver assembly to emit the emergent light when the scanning prism is rotated to the position D.

Specific position information of the above-mentioned positions A, B, C, and D, i.e., the first to fourth angles, may also be selected as needed, so as to take the portion with the highest precision as the working scanning field of view.

Taking the triangular prism as an example, as shown in FIG. 12A, a center point of the triangular prism is located at the coordinate origin of the three-dimensional coordinate system. When the rotation angle is 0, the x axis is perpendicular to the triangle bottom of the cross section of the triangular prism, and the laser beam L2 is incident in a direction perpendicular to the y axis, and the laser beam L3 is incident in a direction that may connect the lower right vertex and the center point of the cross section.

The range of the scanning field of view of the laser beam L2 is shown in FIG. 12B, and if calculated clockwise, the range is between 60 degrees and 300 degrees with respect to the x axis. The range of the scanning field of view of the laser beam L3 is shown in FIG. 12C, and if calculated clockwise, the range is between 180 degrees and 420 degrees with respect to the x axis.

As such, an overlapping field of view exists, and the maximum overlapping range is between 180 and 300 degrees with respect to the x axis.

The scanning prism is rotated to the first angle of 0 degree, the second angle of 60 degrees, the third angle of 60 degrees and the fourth angle of 120 degrees sequentially in the process of rotating by 360/3=120 degrees.

When the scanning prism rotates to 0 degree, the scanning data of the laser beam L3 starts to be obtained, and at this point, the emergent light of the laser beam L3 and the x axis have an angle of 180 degrees. When the scanning prism rotates to 60 degrees, the scanning data of the laser beam L2 starts to be obtained, and at this point, the emergent light of the laser beam L2 and the x axis have an angle of 180 degrees. When the scanning prism rotates to 60 degrees, the scanning data of the laser beam L3 is stopped obtaining, and at this point, the emergent light of the laser beam L3 and the x axis have an angle of 300 degrees. When the scanning prism rotates to 120 degrees, the scanning data of the laser beam L2 is stopped obtaining, and at this point, the emergent light of the laser beam L2 and the x axis have an angle of 300 degrees.

In the above-mentioned embodiment, the maximum overlapping range between the laser beams L2 and L3 is obtained accurately. In addition, the required range may be expanded or narrowed as a working scanning field of view.

For example, the scanning prism is rotated to the first angle of 5 degree, the second angle of 10 degrees, the third angle of 105 degrees and the fourth angle of 110 degrees sequentially in the process of rotating by 360/3=120 degrees.

When the scanning prism rotates to 5 degrees, the scanning data of the laser beam L3 starts to be obtained, and at this point, the emergent light of the laser beam L3 and the x axis have an angle of 190 degrees; when the scanning prism rotates to 10 degrees, the scanning data of the laser beam L2 starts to be obtained, and at this point, the emergent light of the laser beam L2 and the x axis have an angle of 80 degrees; when the scanning prism rotates to 105 degrees, the scanning data of the laser beam L3 is stopped obtaining, and at this point, the emergent light of the laser beam L3 and the x axis have an angle of 390 degrees; when the scanning prism rotates to 110 degrees, the scanning data of the laser beam L2 is stopped obtaining, and at this point, the emergent light of the laser beam L2 and the x axis have an angle of 280 degrees. At this point, the range from 190 degrees to 280 degrees with respect to the x axis is an overlapped field of view, and a horizontal field of view with total 310 degrees may be obtained.

A LiDAR device with other numbers of scanning mirror surfaces has a scanning process in the similar way.

In summary, the technical problem solved by the present disclosure is to increase the number of scanning lines of the laser scanning device based on a limited number of laser emitting units, further expand a horizontal scanning field of view of the laser scanning device, and further increase the number of scanning lines of a center scanning field of view of the laser scanning device.

The present disclosure discloses a laser scanning device, including: a scanning prism, including a plurality of scanning mirror surfaces, wherein the plurality of scanning mirror surfaces are configured to rotate about a scanning axis, a normal of each of the scanning mirror surfaces forms a space angle with the scanning axis, and the values of all the space angles are not all the same; a transceiver assembly, including a laser emitting unit and a laser receiving unit, wherein the laser emitting unit is configured to generate a scanning line by rotation of the scanning mirror surfaces, and the same laser emitting unit is configured to generate a plurality of scanning lines by rotation of the scanning prism.

The laser scanning device includes at least two transceiver assemblies scanning fields of view of which are partially overlapped. Or the laser scanning device includes at least three transceiver assemblies which are disposed around the scanning prism, and the fields of view of which are abutted upon each other successively to form a continuous field of view.

At least some of the transceiver assemblies are symmetrically dispose relative to the scanning axis. Spatial-attitude angles of the transceiver assemblies relative to the scanning axis each are different or the same. Axial heights of the transceiver assemblies along the scanning axis are different or the same. The scanning prism includes three, four, five or six scanning mirror surfaces. The space angles are decremented by a same angular difference. Each of the transceiver assemblies includes a plurality of laser emitting units and a plurality of laser receiving units, wherein each laser emitting unit is configured to emit a laser beam, and angles are formed between any two the laser beams. The laser beams are arranged in a divergent state or a convergent state.

The same scanning mirror surface not only reflects achieves the laser beams, but also receives a signal light returned after the laser beams are irradiated on a target, and reflects the signal light to the laser receiving unit corresponding to the laser emitting unit emitting the laser beams.

The present disclosure discloses a LiDAR device, including the laser scanning device.

The present disclosure further discloses a scanning method of the LiDAR device, further including: providing a transceiver assembly including a laser emitting unit and a laser receiving unit; rotating a scanning prism with a plurality of scanning mirror surfaces about a scanning axis;

projecting a laser beam by the laser emitting unit to the scanning mirror surfaces, and generating scanning lines by rotating the scanning mirror surfaces, wherein a normal of each of the scanning mirror surfaces forms a space angle with the scanning axis, and the values of the space angles each are not all the same, such that the same laser emitting unit generates the plural scanning lines.

The method includes reflecting, by the scanning mirror surface, to the laser receiving unit corresponding to the laser emitting unit generating the scanning line, a signal light corresponding to the scanning line and returned by a target.

The method includes an emergent light generated after the laser beam projected by the laser emitting unit towards the scanning prism is reflected conforming to the following formula:

$$H\_Angle = \begin{cases} 2*theta + alpha & (0 \leq theta < 360/N) \\ 2*(theta - 360/N) + alpha & (360/N \leq theta < 2*360/N) \\ 2*(theta - 2*360/N) + alpha & (2*360/N \leq theta < 3*360/N) \\ M & \\ 2*(theta - (N-1)*360/N) + alpha & ((N-1)*360/N \leq theta < N*360/N) \end{cases}$$

$$V\_Angle = Lidar\_Angle(Lidar\_NUM) + Mirror\_Angle$$

$$X = Range * cos(V\_Angle * D2Rad) * cos(H\_Angle * D2Rad)$$

$$Y = Range * cos(V\_Angle * D2Rad) sin(-H\_Angle * D2Rad)$$

$$Z = Range * sin(V\_Angle * D2Rad)$$

wherein a coordinate system is established with a center point of a section of the scanning axis in the scanning prism as a coordinate origin, the scanning axis as a z axis, an x axis and a y axis are established in a horizontal plane, H_Angle is an angle between a projection of the emergent light in the horizontal plane and the x axis, V_Angle is an angle between the emergent light and the horizontal plane, N is the number of the scanning mirror surfaces of the scanning prism, Lidar_NUM is a serial number of the laser emitting unit, Lidar_Angle (Lidar_NUM) is an angle between the laser beam of the laser emitting unit with the serial number of Lidar_NUM and the horizontal plane, Mirror_Angle is an angle between the normal of the scanning mirror surface generating the emergent light and the horizontal plane, alpha is an angle between the x axis and the projection of the emergent light in the horizontal plane in a clockwise direction when a rotation angle of the scanning prism is 0, Range is a ranging value of the emergent light measured by the LiDAR device, D2Rad is a constant, and X, Y, and Z are three-dimensional coordinates of the target reflecting the emergent light respectively, wherein when the scanning prism rotates clockwise, theta is the rotation angle of the scanning prism, and when the scanning prism rotates counterclockwise, theta is 360—the rotation angle of the prism.

The method includes the scanning prism rotating to pass through a first angle, a second angle, a third angle and a fourth angle sequentially in a process of rotating by 360/N degrees;

when the scanning prism is detected to rotate to the first angle, obtaining the signal light of the first transceiver assembly for the first scanning mirror surface; when the scanning prism is detected to rotate to the second angle, obtaining the signal light of the second transceiver assembly for the second scanning mirror surface; when the scanning prism is detected to rotate to the third angle, stopping obtaining the signal light of the first transceiver assembly for the first scanning mirror surface; and when the scanning prism is detected to rotate to the fourth angle, stopping obtaining the signal light of the second transceiver assembly for the second scanning mirror surface.

In the method, the step of obtaining the signal light of the first transceiver assembly for the first scanning mirror surface further includes: driving the laser emitting unit of the first transceiver assembly to project the laser beam; wherein the step of stopping obtaining the signal light of the first transceiver assembly for the first scanning mirror surface further includes: stopping driving the laser emitting unit of the first transceiver assembly to project the laser beam.

INDUSTRIAL APPLICABILITY

The horizontal scanning field of view of the LiDAR device can be expanded. The number of the scanning lines of the LiDAR device can be increased. Further, the number of the scanning lines of the central scanning field of view of the LiDAR device can be increased, and the scanning data of the central field of view can be enriched. A small number of laser emitting units can be used for generating scanning lines with a number exceeding the number of the configured laser emitting units, the number of the components inside the LiDAR device may be decreased, and component arrangement, volume compression and cost reduction may be facilitated.

What is claimed is:

1. A laser scanning device, comprising:
    a scanning prism, comprising a plurality of scanning mirror surfaces, wherein the plurality of scanning mirror surfaces are configured to rotate about a scanning axis, wherein the normal of each of the scanning mirror surfaces forms a space angle with the scanning axis, while the space angles formed by every scanning mirror surface are not all the same; and
    at least two transceiver assemblies that include a first transceiver assembly and a second transceiver assembly,
        wherein each of the transceiver assemblies includes laser emitting unit and a laser receiving unit,
        wherein the laser emitting unit of each of the transceiver assemblies is configured to generate a plurality of scanning lines by rotation of the scanning mirror surfaces,
        wherein scanning fields of view of the first transceiver assembly overlaps scanning fields of view of the second transceiver assembly;
        wherein the laser emitting units of the first transceiver assembly and the second transceiver assembly emit laser beams simultaneously, and the laser receiving units of the first transceiver assembly and the second transceiver assembly receive laser beams simultaneously;
        wherein the laser emitting unit of the first transceiver assembly is located above the laser receiving unit of the first transceiver assembly, and the laser receiving unit of the second transceiver assembly is located above the laser emitting unit of the second transceiver assembly;
        wherein each of the laser receiving units is controlled to only receive a signal light from a specific portion of the scanning field of view of one scanning mirror surface to obtain a highest precision; and wherein each scanning line produced by the first transceiver assembly is adjacent to at least one scanning line produced by the second transceiver assembly.

2. The laser scanning device according to claim 1, wherein the at least two transceiver assemblies further comprise a third transceiver assembly and a fourth transceiver assembly, the third transceiver assembly is disposed right above the first transceiver assembly, and the fourth transceiver assembly is disposed right above the second transceiver assembly.

3. The laser scanning device according to claim 1, wherein the laser scanning device comprises at least three transceiver assemblies which are disposed around the scanning prism and the fields of view of which are abutted upon each other successively to form a continuous field of view.

4. The laser scanning device according to claim 3, wherein at least some of the transceiver assemblies are symmetrically disposed relative to the scanning axis.

5. The laser scanning device according to claim 3, wherein spatial-attitude angles of the transceiver assemblies relative to the scanning axis each are different.

6. The laser scanning device according to claim 3, wherein axial heights of the transceiver assemblies along the scanning axis are different.

7. The laser scanning device according to claim 1, wherein the scanning prism comprises three, four, five or six scanning mirror surfaces.

8. The laser scanning device according to claim 7, wherein the space angles are decremented by a same angular difference.

9. The laser scanning device according to claim 3, wherein each of the transceiver assemblies comprises a plurality of laser emitting units and a plurality of laser receiving units, wherein each laser emitting unit is configured to emit a laser beam, and angles are formed between any two the laser beams emitted by the laser emitting units of the same transceiver assembly.

10. The laser scanning device according to claim 9, wherein the laser beams are arranged in a divergent state or a convergent state;
the horizontal angles of the laser beams of the laser emitting units of the first transceiver assembly with respect to the horizontal axis are different from the horizontal angles of the laser beams of the laser emitting units of the second transceiver assembly with respect to the horizontal axis.

11. The laser scanning device according to claim 9, wherein the same scanning mirror surface is configured to not only reflect the laser beams, but also receive a signal light returned after the laser beams are irradiated on a target, and to reflect the signal light to the laser receiving unit corresponding to the laser emitting unit emitting the laser beams.

12. A LiDAR device, comprising:
the laser scanning device according claim 1.

13. A scanning method applied to the LiDAR device according to claim 12, further comprising:
providing a transceiver assembly comprising a laser emitting unit and a laser receiving unit;
rotating a scanning prism with a plurality of scanning mirror surfaces about a scanning axis;
projecting a laser beam by the laser emitting unit to the scanning mirror surfaces, and generating scanning lines by rotating the scanning mirror surfaces, wherein a normal of each of the scanning mirror surfaces forms a space angle with the scanning axis, and values of the space angles each are not all the same, such that the same laser emitting unit generates the plurality of scanning lines.

14. The method according to claim 13, wherein the at least two transceiver assemblies further comprise a third transceiver assembly and a fourth transceiver assembly, the third transceiver assembly is disposed right above the first transceiver assembly, and the fourth transceiver assembly is disposed right above the second transceiver assembly.

15. The method according to claim 13, wherein at least three transceiver assemblies, which are disposed around the scanning prism, and the fields of view of all the transceiver assemblies are abutted upon successively to form a continuous field of view, are provided.

16. The method according to claim 13, wherein the scanning mirror surface reflects, to the laser receiving unit corresponding to the laser emitting unit generating the scanning line, a signal light corresponding to the scanning line and returned by a target.

17. The method according to claim 13, wherein an emergent light generated after the laser beam projected by the laser emitting unit towards the scanning prism is reflected conforms to the following formula:

$$H\_Angle = \begin{cases} 2*theta + alpha & (0 \leq theta < 360/N) \\ 2*(theta - 360/N) + alpha & (360/N \leq theta < 2*360/N) \\ 2*(theta - 2*360/N) + alpha & (2*360/N \leq theta < 3*360/N) \\ M & \\ 2*(theta - (N-1)*360/N) + alpha & ((N-1)*360/N \leq theta < N*360/N) \end{cases}$$

$$V\_Angle = Lidar\_Angle(Lidar\_NUM) + Mirror\_Angle$$

$$X = Range*cos(V\_Angle*D2Rad)*cos(H\_Angle*D2Rad)$$

$$Y = Range*cos(V\_Angle*D2Rad)sin(-H\_Angle*D2Rad)$$

$$Z = Range*sin(V\_Angle*D2Rad)$$

wherein a coordinate system is established with a center point of a section of the scanning axis in the scanning prism as a coordinate origin, the scanning axis as a z axis, an x axis and a y axis are established in a horizontal plane, H_Angle is an angle between a projection of the emergent light in the horizontal plane and the x axis, V_Angle is an angle between the emergent light and the horizontal plane, N is the number of the scanning mirror surfaces of the scanning prism, Lidar_NUM is a serial number of the laser emitting unit, Lidar_Angle (Lidar_NUM) is an angle between the laser beam of the laser emitting unit with the serial number of Lidar_NUM and the horizontal plane, Mirror_Angle is an angle between the normal of the scanning mirror surface generating the emergent light and the horizontal plane, alpha is an angle between the x axis and the projection of the emergent light in the horizontal plane in a clockwise direction when a rotation angle of the scanning prism is 0, Range is a ranging value of the emergent light measured by the LiDAR device, D2Rad is a constant, and X, Y, and Z are three-dimensional coordinates of the target reflecting the emergent light respectively, wherein when the scanning prism rotates clockwise, theta is the rotation angle of the scanning prism, and when the scanning prism rotates counterclockwise, theta is 360-the rotation angle of the prism.

18. The method according to claim 14, further comprising:
rotating the scanning prism to pass through a first angle, a second angle, a third angle and a fourth angle sequentially in a process of rotating by 360/N degrees, wherein N is the number of the scanning mirror surfaces of the scanning prism;
obtaining the signal light of the first transceiver assembly for the first scanning mirror surface when the scanning prism is detected to rotate to the first angle;
obtaining the signal light of the second transceiver assembly for the second scanning mirror surface when the scanning prism is detected to rotate to the second angle;
stopping obtaining the signal light of the first transceiver assembly for the first scanning mirror surface when the scanning prism is detected to rotate to the third angle; and
stopping obtaining the signal light of the second transceiver assembly for the second scanning mirror surface when the scanning prism is detected to rotate to the fourth angle.

19. The method according to claim 18, wherein the step of obtaining the signal light of the first transceiver assembly for the first scanning mirror surface further comprises:
driving the laser emitting unit of the first transceiver assembly to project the laser beam;
wherein the step of stopping obtaining the signal light of the first transceiver assembly for the first scanning mirror surface further comprises:
stopping driving the laser emitting unit of the first transceiver assembly to project the laser beam.

20. The laser scanning device according to claim 1, wherein
during rotating the scanning prism to pass through a first angle, a second angle, a third angle and a fourth angle sequentially in a process of rotating by 360/N degrees:
the laser receiving unit of the first transceiver assembly is controlled to obtain the signal light of the first scanning mirror surface when the scanning prism is detected to rotate to the first angle;
the laser receiving unit of the second transceiver assembly is controlled to obtain the signal light of the second scanning mirror surface when the scanning prism is detected to rotate to the second angle;
the laser receiving unit of the first transceiver assembly is controlled to stop obtaining the signal light of the first scanning mirror surface when the scanning prism is detected to rotate to the third angle; and
the laser receiving unit of the second transceiver assembly is controlled to stop obtaining the signal light of the second scanning mirror surface when the scanning prism is detected to rotate to the fourth angle, in order that the field of view with the highest precision is used as the working scanning field while the scanning fields of view of the first transceiver assembly and the second transceiver assembly are overlapped;
wherein N is the number of the scanning mirror surfaces of the scanning prism.

\* \* \* \* \*

UNITED STATES PATENT AND TRADEMARK OFFICE
CERTIFICATE OF CORRECTION

PATENT NO. : 11,555,893 B2
APPLICATION NO. : 16/606580
DATED : January 17, 2023
INVENTOR(S) : Zhiwu Zhang It is certified that error appears in the above-identified patent and that said Letters Patent is hereby corrected as shown below:

On the Title Page

Item (54) and in the Specification, Column 1, Lines 1-3, Please correct the title from:
LASER SCANNING DEVICE, RADAR DEVICE AND SCANNING METHOD THEREOF
To:
LASER SCANNING DEVICE, LIDAR DEVICE AND LASER SCANNING METHOD Signed and Sealed this
Thirtieth Day of May, 2023

Katherine Kelly Vidal
*Director of the United States Patent and Trademark Office*